United States Patent [19]

Koshida et al.

[11] Patent Number: 4,889,978

[45] Date of Patent: Dec. 26, 1989

[54] CASH DISPENSER WITH MANIFOLD SAFE

[75] Inventors: Yoshinori Koshida; Isao Miyake; Yasuo Okazaki; Nobuhiro Motoi; Mitsuru Nakaya, all of Tokyo, Japan

[73] Assignee: Oki Electric Industry Co., Ltd., Tokyo, Japan

[21] Appl. No.: 255,270

[22] Filed: Oct. 11, 1988

[30] Foreign Application Priority Data

| | | | |
|---|---|---|---|
| Oct. 8, 1987 | [JP] | Japan | 62-252475 |
| Oct. 8, 1987 | [JP] | Japan | 62-252476 |
| Oct. 8, 1987 | [JP] | Japan | 62-252477 |
| Oct. 8, 1987 | [JP] | Japan | 62-252474 |
| Jun. 13, 1988 | [JP] | Japan | 63-143643 |
| Aug. 9, 1988 | [JP] | Japan | 63-197053 |

[51] Int. Cl.⁴ .................. G06F 15/30

[52] U.S. Cl. .................. 235/379; 235/381

[58] Field of Search .................. 235/379, 381

[56] References Cited

U.S. PATENT DOCUMENTS 4,745,266 5/1988 Miura .................. 235/379

*Primary Examiner*—Harold I. Pitts

*Attorney, Agent, or Firm*—Wenderoth, Lind & Ponack

[57] ABSTRACT

A cash dispenser for dispensing bills in response to a customer's operation includes a bill outlet for presenting bills to a customer, and a safe removably mounted on the cash dispenser and loaded with bills to be dispensed. Feeding and transporting paths feed bills from the safe and transport them to the bill outlet. The safe includes a single casing in which a plurality of storing sections are defined. The storing sections are disposed at substantially the same level as each other and store bills individually. The feeding and transporting paths include a plurality of feeding devices each being associated with a respective one of the storing sections for feeding the bills one by one from the storing sections. The feeding and transporting paths further include transport belts for transporting the bills fed outo the bill outlet and a sensor for sensing the conditions of bills.

16 Claims, 16 Drawing Sheets

CASH DISPENSER WITH MANIFOLD SAFE

BACKGROUND OF THE INVENTION

1. Field of the Invention

The present invention relates to a cash dispenser which may be installed in a bank or similiar monetary facility for automatically dispensing bills in response to customer's operations and, more particularly, to a cash dispenser capable of offering a plurality of kinds of bills.

2. Description of the Prior Art

A cash dispenser is constructed such that, when a customer inserts an identification card into the dispenser and then performs a sequence of necessary operations, the dispenser releases a certain amount of bills as demanded by the customer, as is well known in the art. At the instant when the dispenser produces bills as stated, it prints out particulars of the account on a slip and ejects such a slip together with the bills. Generally, a cash dispenser of the type having a plurality of independent safes to dispense different kinds of bills as desired is known in the art.

FIG. 1 is a schematic side elevation showing a prior art cash dispenser of the type described. As shown, the prior art cash dispenser includes a housing 1 which is provided with a bill outlet 2 at its front end and a rear door 3 at its rear end. A disbursing mechanism 4 is installed in the housing 1 for presenting bills to a customer. Although not shown in the figure, there are further provided on the front end of the housing 1 an operation board on which various keys are accessible to enter a customer's code, a desired amount of money and other necessary data, and a display for guiding a customer during manipulation of the operation board and showing various kinds of information. The housing 1 accommodates therein a voice generator for producing audible messages in association with the display, a card reader/writer, a printer, a power source mechanism, and a controller for controlling the entire cash dispenser.

The disbursing mechanism 4 includes a shutter 5 which is openably disposed in the bill outlet 2, and a stage 6 located in the vicinity of the shutter 5 for stacking bills thereon. The stage 6 is usually held in a horizontal position and is rotatable downward about one end thereof as indicated by dash-and-dot lines as needed. A stacking roller 7 is positioned at one end of the stage 6.

A first safe 8 and a second safe 9 individually store therein bills which may be dispensed by the cash dispenser. Here, the bills in the first safe 8 and those in the second safe 9 are assumed to be Y1000 (one thousand yen) bills and ¥10,000 (ten thousand yen) bills, respectively. The safes 8 and 9 are disposed one above the other in the neighborhood of the rear door 3. When the rear door 3 is opened, the safes 8 and 9 may each be pulled out to the rear of the disbursing mechanism 4.

Feeding means 10 and 11 are positioned at outlets of the first and second safes 8 and 9, respectively. Each of the feeding means 10 and 11 includes a pick-up roller for feeding ¥1000 bills or ¥10,000 bills one by one from the safe 8 or 9 associated therewith, a feed roller for driving the bill picked up by the pick-up roller to a transport path which will be described, and a reverse roller for preventing two or more bills from being fed together (hereinafter referred to as an overlap feed).

Transport paths 12*a*, 12*b* and 12*c* are provided for transporting bills while holding them, and each is made up of a belt, rollers, etc. The feeding means 10 is connected to the stacking roller 7 by the transport path 12*a* while the feeding means 11 is connected to the stacking roller 7 by the transport paths 12*b* and 12*c*.

A reject safe 13 is located immediately below the stage 6. A full sensor 14 is located in the vicinity of an open top of the reject safe 13 for sensing a full condition of the safe 13. While the reject safe 13 may be removed from one side of the disbursing mechanism 4, it in practice is removed from the disbursing mechanism 4 by opening the rear door 3 and then pulling out the disbursing mechanism bodily to the rear of the housing 1.

Although not shown in the figure, a sensor for monitoring the conditions of transport bills and a discriminating section for identifying the kind of bills and counting the bills are disposed on the transport paths 12*a* to 12*c* of the disbursing mechanism. A controller, not shown, controls the operations of the shutter 5, stage 6, feeding means 10 and 11 and transport paths 12*a* to 12*c* in response to the outputs of the above-mentioned sensor and discriminating section as well as data keyed into the operation board.

In operation, when a customer inserts a card into a card inlet/outlet, not shown, and then manipulates keys on the operation board to enter a code and a desired amount of money, the feeding means 10 and 11 feed ¥1000 bills and ¥10,000 bills one by one out of the safes 8 and 9, respectively. Each bill coming out of the safes 8 and 9 is conveyed along the transport paths 12*a* to 12*c* and stacked on the stage 6 by the stacking roller 7. After bills of the amount and number requested by the customer have been stacked on the stage 6, a slip printed with particulars of the account is fed from a printer, not shown, onto the stack of bills. Then, the shutter 5 is opened by suitable means, not shown, so that the customer may pick up the bills from the stage 6 through the outlet 2.

When any of the bills being driven along the transport paths 12*a* to 12*c* is determined to be in an unusual condition of transport, alien with respect to kind or uncountable, it is piled on the stage 6. Thereafter, the stage 6 is rotated downward as indicated by an arrow by predetermined means, not shown, so that such unusual bills are dropped into the reject safe 13 together with other or normal bills. After the stage 6 has been restored to its horizontal position, the same sequence of steps, i.e., feeding bills, transporting the bills and stacking the bills on the stage 6 is repeated. The resulting stack of bills are presented to a customer together with a slip which is fed from the printer.

Assume that a customer fails to pick up bills, i.e., a customer has forgotten to remove bills after the shutter 5 has opened. Then, the shutter 5 is closed upon the lapse of a predetermined period of time and the stage 6 is rotated downward to deposit those bills into the reject safe 13.

A cash dispenser of the type collecting bills inadvertently left unremoved and unusual or defective bills independently of each other is also known in the art. As shown in FIG. 2, this type of cash dispenser includes an extra box 14 located below the stage 6 and arranged next to the reject safe 13. The reject safe 13 is connected to the trailing end of the transport path 12*c* by an additional transport path 12*d*. A discriminting section is disposed on the transport path 12*c* for identifying the kind of bills and detecting skew, overlap feed and other troubles associated with bills.

Normal bills free from defects as determined by the discriminating means are transported to the end of the transport path 12*c* and then stacked on the stage 6 by the stacking roller 7. On the other hand, unusual bills detected by the discriminating means are transported to the end of the transport path 12*c* and then collected into the reject safe 13 by way of the transport path 12*d*. Further, when a customer fails to remove bills after the shutter 5 has been opened, the shutter 5 is closed upon the lapse of a predetermined period of time and the stage 6 is rotated downward to drop those bills into the box 14. Subsequently, the stage 6 is rotated upward to the horizontal position.

The prior art cash dispenser of the first-mentioned type has various problems left unsolved. Specifically, since the two exclusive safes individually assigned to ¥1000 bills and ¥10,000 bills and the reject safe are independent of each other, they have to be mounted and dismounted in the event of operation of the cash dispenser or of close inspection of bills, for example, and it is difficult to carry all the three safes at the same time. The cash dispenser therefore cannot be operated or transported with efficiency. Bills determined to be unusual by the discriminating section are rejected and collected into the reject safe together with normal bills which are detained on the stage for a short period of time. This not only reduces the efficiency of use of the available fills but also results in the need for an extra period of time for repeating the entire procedure.

Each of the safes is configured to exclusively accommodate a single kind of bills therein, and only two kinds of bills can be identified. More specifically, the exclusive safe for ¥1000 bills and the exclusive safe for ¥10,000 bills cannot accommodate any other kind of bills, and the controller controls the cash dispenser on the assumption that the cash dispenser dispenses such two kinds of bills only. Hence, operating the cash dispenser by loading it with a great number of bills of the same kind as may be desired on a holiday, nighttime and at an unmanned facility, for example, is impracticable. In this sense, the prior art cash dispenser lacks flexibility.

Another problem concerning the flexibility of operation is that even though the safe for ¥1000 bills may accommodate ¥10,000 bills, the ¥10,000 bills fed from the safe will be determined to be of an alien kind and therefore rejected. Even if the safe for ¥10,000 bills is shifted to the position which is originally allocated to the safe for ¥1000 bills, it will be prevented from settling in that position by an arrangement which is adapted to eliminate erroneous insertion of a safe or the ¥10,000 bills will be rejected by the discriminating section due to the absence of means for informing such section of the replacement of ¥1000 bills with ¥10,000 bills. This also makes it impossible for the cash dispenser to be operated with a great number of bills of the same kind.

Generally, the maximum number of bills which a cash dispenser of the kind described can offer for one transaction or payment is predetermined, e.g. fifty. It has been customary to set the same value as such a maximum number of bills invariable as a threshold for the detection of a state in which bills are about to run out, i.e., a near-end state. When a sensor or similar means senses the near-end state, the operation of the cash dispenser is automatically interrupted. In practice, however, it rarely occurs that bills are dispensed to the very limit by one transaction. It follows that once the near-end condition is sensed, any further payment becomes unavailable despite the fact that a substantial number of bills may still be present in the cash dispenser, resulting in poor efficiency of use of the fills available.

Parallel to the progress of automatic transactions, there is an increasing demand for the installation of a greater number of cash dispensers in a limited space. To meet this demand, there has been proposed a cash dispenser which may be situated against a wall and is accessible from the front for maintenance, and a cash dispenser which may be located at a distance from a wall and is accessible from the rear for maintenance. A problem with the prior art cash dispenser is that the feeding means are fixed in place at the deepest end of the insertion path to be capable of abutting against the bills which are stored in the respective safes. In this condition, the feeding means obstructs the insertion of the safes along the insertion path and therefore prevents the insertion path from being defined throughout the front and rear ends of the cash dispenser, limiting the ability to perform maintenance on either the rear access type or the front access type of dispenser. This problem cannot be solved unless two different types of products are prepared at the sacrifice of cost.

In light of the above, an arrangement may be made such that the feeding means are individually movable into contact with the bills in the safes after the safes have been inserted into the cash dispenser. However, as the safes are repeatedly mounted and dismounted while the cash dispenser is used, the accuracy of the feeding means is affected.

Another approach for overcoming the above problem may be mounting the feeding means on the safes themselves. However, this brings about another problem that each safe becomes heavy and difficult to operate.

The feeding means of the prior art cash dispenser are securely mounted at the deepest end of the insertion path for the previously stated purpose. Hence, the number of safes which are independent of each other and mounted one by one have to be increased with an increase in the kinds of bills handled, resulting in a large-scale cash dispenser and troublesome operations for close inspection.

SUMMARY OF THE INVENTION

It is therefore an object of the present invention to provide a cash dispenser which promotes easy manipulation of a safe and efficient maintenance while enhancing flexible handling of bills.

In accordance with the present invention, in a cash dispenser for dispensing bills in response to a customer's operation and including a bill outlet for presenting bills to a customer, a safe removably mounted on the cash dispenser and loaded with bills to be dispensed, and feeding and transporting means for feeding bills from the safe and transporting the bills to the bill outlet; the safe comprises a single casing in which a plurality of storing sections are defined. The storing sections are disposed at substantially the same level and store bills individually. The feeding and transporting means includes a plurality of feeding devices each being associated with a respective one of the storing sections for feeding the bills one by one from the storing sections associated therewith. Transport paths are provided for transporting the bills fed by the feeding means to the bill outlet.

BRIEF DESCRIPTION OF THE DRAWINGS

The objects and features of the present invention will become more apparent from a consideration of the following detailed description in conjunction with the accompanying drawings in which.

DESCRIPTION OF THE PREFERRED EMBODIMENTS

Figure 1:
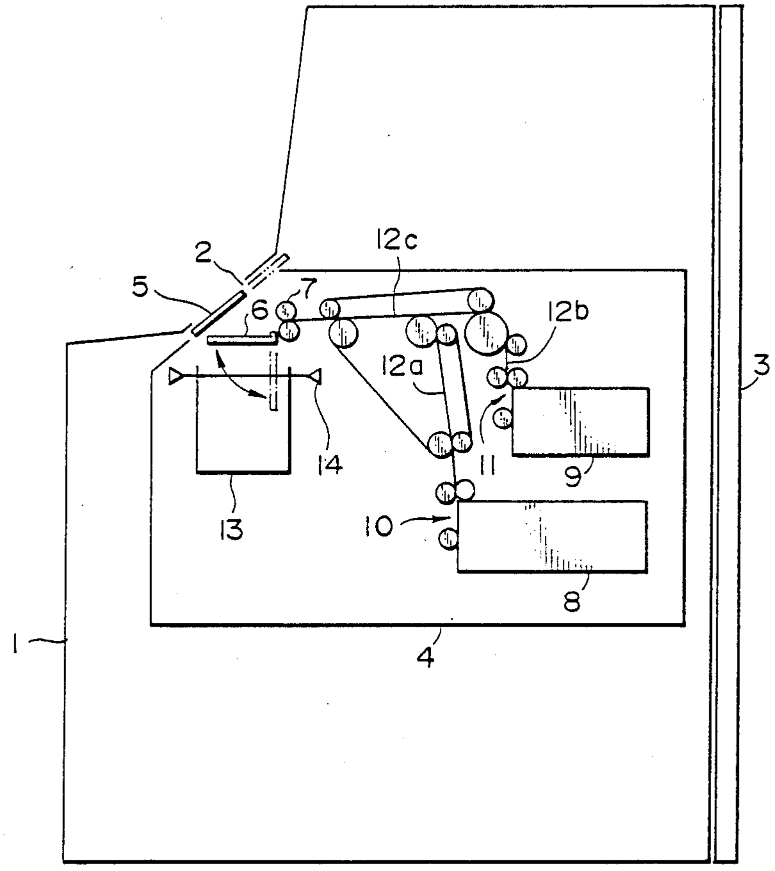
FIG. 1 PRIOR ART
FIGS. 1 and 2 are schematic sections showing a prior art cash dispenser.
Figure 2:
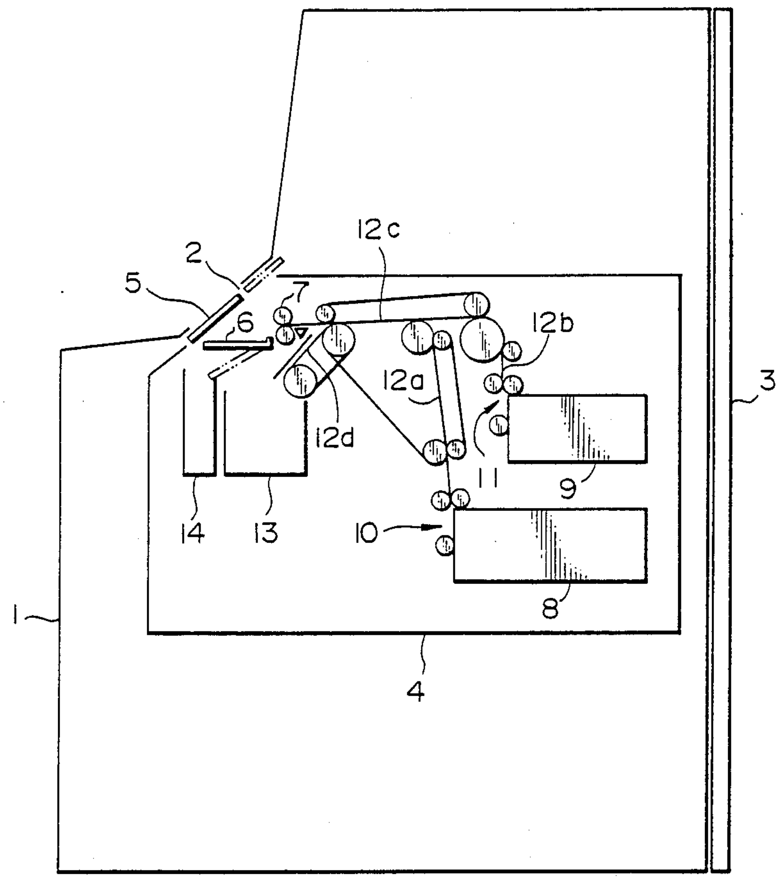
FIG. 2 PRIOR ART
Figure 3:
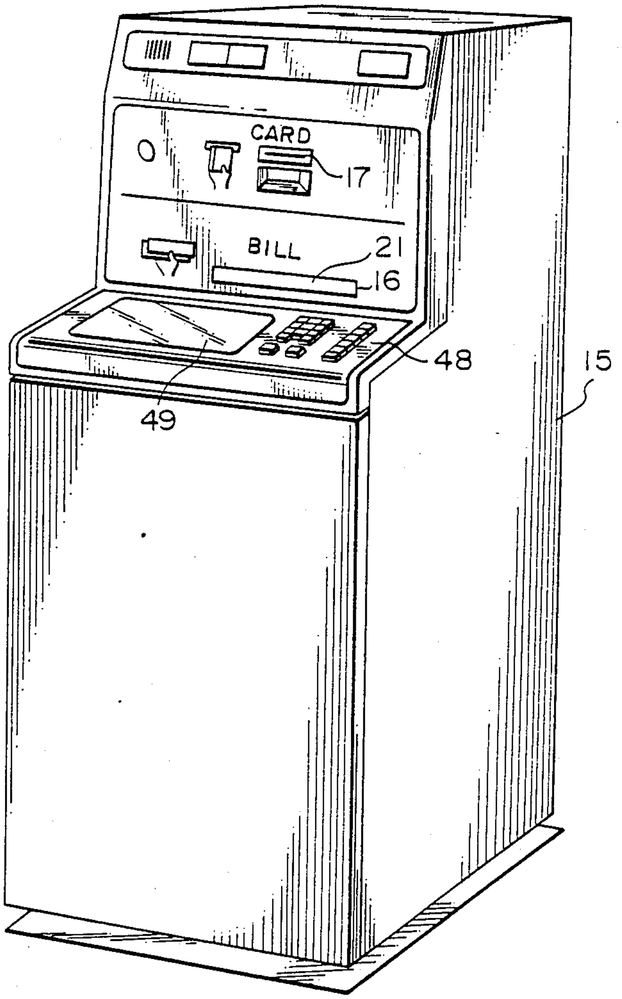
FIG. 3 is a perspective view showing the external appearance of a cash dispenser embodying the present invention.
Figure 4:
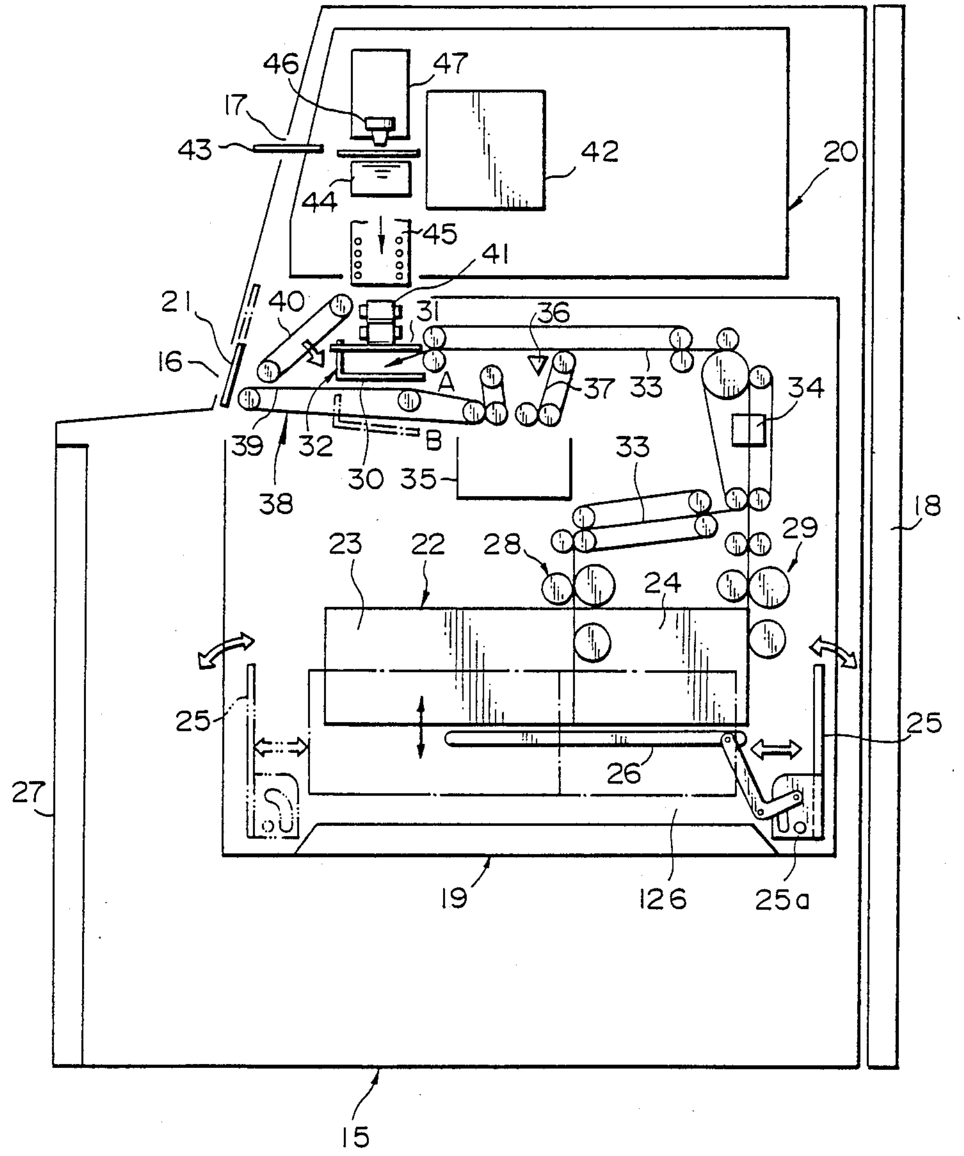
FIG. 4 is a view similar to FIG. 1, schematically showing the internal arrangement of the cash dispenser shown in FIG. 3.

Referring to FIGS. 3 and 4, a cash dispenser embodying the present invention is shown and includes a housing 15. The housing 15 is provided at its front end with a bill outlet 16 and a card inlet/outlet 17. A door 18 is openably mounted on the rear end of the housing 15. A disbursing mechanism 19 and a card reader/printer 20 are installed in the housing 15.

The disbursing mechanism 19 includes a shutter 21 which is openably provided in the bill outlet, and a safe 22 which stores bills therein. The safe 22 is constituted by a first storing section 23 and a second storing section 24 which are arranged side by side in an integral assembly. Usually, ¥10,000 (ten-thousand yen) bills and ¥1000 (thousand yen) bills are stored in the storing sections 23 and 24, respectively.

An internal door 25 is openable to mount and dismount the safe or manifold safe 22 from the disbursing mechanism 19. Links 26 are operatively connected to the internal door 25. The door 25 and links 26 cooperate with a safe support frame 129, FIG. 6, to constitute lifting means for lifting the safe 22. Specifically, when the internal door 25 is closed, the links 26 lift the safe 22 through the frame 129; when the door 25 is opened, the links 26 lower the safe 22 through the frame 129. The internal door 25 is rotatable about a pivot 25*a* as indicated by an arrow in FIG. 4. The internal door 25 is openable only when the rear door 18 of the housing 15 is open. When the internal door 25 is opened, the safe 22 may be mounted or dismounted from the disbursing mechanism 19 as desired. A path 126 for inserting the safe 22 into the disbursing mechanism 19 extends horizontally in the lowermost part of the mechanism 19 in association with the internal door 25.

While the internal door 25 is shown as being located in a rear lower part of the disbursing mechanism 19, it may alternatively be disposed in a front lower part of the mechanism 19 as represented by a dash-and-dot lines in FIG. 4 with the links 26 being interlocked with such a door. In this alternative case, a front door 27 will be provided at the front end of the housing 15 to mount and dismount the safe 22. However, the construction of the safe and the orientation of feeding means 28 and 29 which will be described are the same as those of the rear access type arrangement and do not need any modification. More specifically, in the illustrative embodiment, a front access type and a rear access type arrangement are selectively implemented simply by reversing the construction which is associated with the doors.

Feeding means 28 and 29 are located at outlets of the first and second storing sections 23 and 24 of the manifold safe 22, respectively. Each of the feeding means 28 and 29 includes a pick-up roller for picking up bills from its associated storing section 23 or 24, a feed roller for driving a bill picked up by the pick-up roller to a transport path which will be described, and a reverse roller for preventing two or more bills from being fed together. The feeding means 28 and 29 are fixed in place immediately above the previously mentioned insertion path 126.

A first stage 30 is adapted to stack thereon only normal bills which are free from defects while a second state 31 disposed above the first stage 30 is adapted to have placed thereon a slip. These two stages 30 and 31 in combination constitute a temporary stacking section 32. The first stage 30 is rotatable from a position A indicated by a solid line to a position B indicated by a dash-an-dot lines when driven by driving means, not shown. The second stage 31 is located at a distance from an upper transport belt 40 which is sufficient not to interfere with angular movement of the upper transport belt 40. The upper transport belt 40 defines a third transport path, as described in detail later.

A first transport path 33 is provided for conveying a bill while holding it. Formed by belts and rollers, the transport path 33 extends from the feeding means 28 and terminates at one end of the first stage 30 via the feeding means 29. A discriminating section 34 is located at a predetermined position on the first transport path 33. Various functions are assigned to the discriminating section 34 such as distinguishing the kinds of bills fed from the manifold safe 22 from each other, detecting skew, overlap feed and other troubles of bills, and counting normal bills.

A reject safe 35 is located below and rearwardly of the temporary stacking section 32. While the reject safe 35 is removable from one side of the disbursing mechanism 19, it in practice is removed from the mechanism 19 after opening the rear door 18 and the pulling the mechanism 19 bodily to the rear of the housing 15.

A rotatable blade 36 is positioned in the first transport path 33 between the temporary stacking section 32 and the discriminating section 34 for the purpose of redirecting bills being driven along the path 33. A second path 37 branches off the first transport path 33 at the position where the blade 36 is located and terminates at the reject safe 35.

A third transport path 38 serves as reversible transport means and is defined by a lower transport belt 39 and the upper transport belt 40. Disposed immediately below the temporary stacking section 32, the lower transport belt 39 is located with one end thereof in the vicinity of the shutter 21 and the other end thereof above the reject safe 35. The upper transport belt 40 is rotatable about an end adjacent to the shutter so as to convey bills in either direction while holding the bills in cooperation with the lower transport belt 39. A slip transport belt 41 is provided at one side of the second stage 31 of the temporary stacking section 32.

The various parts and elements described so far constitute the disbursing mechanism 19.

The card reader/printer 20 includes a card reader/writer 42 for selectively reading identification data and account data particular to a customer from a card 43 and writing predetermined data. A continuous webbing of paper 44 is made up of a blank or nonprinted slip sheet and a journal sheet for preserving the records of transactions. A printed slip 45 is fed from the card reader/printer 20 to the disbursing mechanism 19. A printer 46 is provided for printing particulars of an account on the paper 44 and made up of a print head, a head driving arrangement, etc. The journal sheet recorded with particulars is taken up by a take-up section 47.

As shown in FIG. 3, inputting means in the form of an operation board 48 is situated on the front end of the housing 15 and accessible for entering a customer's code, desired amount of money, etc. The operation board 48 is provided with numeral keys and various function keys. Also situated on the front end of the housing 15 is a cathode ray tube (CRT) or similar display 49 which serves as display means for guiding a customer for ease of manipulation and displaying various data. Although not shown in the figures, a voice generator is also accommodated in the housing 15 for producing audible messages in association with the different kinds of information which appear on the display 49.

Figure 5:
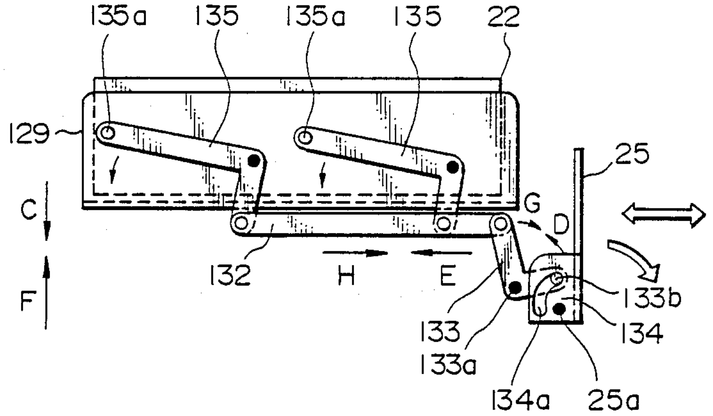
FIG. 5 is a side elevation schematically showing a portion of and embodiment of an arrangement for accommodating a safe.
Figure 6:
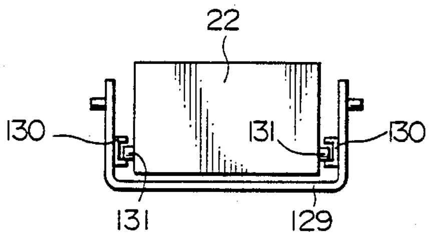
FIG. 6 is a front view of the safe accommodating portion of FIG. 5.

Referring to FIGS. 5 and 6, the lifting structure associated with the manifold safe 22 is shown in detail. Guide rails 130 are mounted on opposite inner surfaces of the safe support frame 129 which is in turn disclosed above the insertion path 126 as stated earlier. Guide blocks 131 extend linearly on and along the opposite side walls of the safe 22 and are slidably mated with the respective guide rails 130. Links 132 are individually movable along a horizontal path in interlocked relation with the internal door 25. Levers 133 are each rotatable about a fulcrum 133*a* and connected at one end to the internal door 25 and at the other end to its associated link 132. The link 133 therefore transmits the opening and closing motions of the internal door 25 to the links 132. In the illustrated embodiment, the amount of interlocked movement is regulated by cam plates 134 and rollers 133*b*. The cam plates 134 are each securely mounted on one end of the inner door 25 and provided with an arcuated slot 134*a*. The rollers 133*b* are individually mounted on one end of the levers 133 and received in the slots 134*a* of the cam plates 134.

A pair of lift levers 135 are connected at first ends thereof to the associated link 132 and at second ends thereof to the safe support frame 129. As each link 132 is moved in any direction, the respective lift levers 135 cooperate to raise or lower points of connection 135*a* thereof to the safe support frame 129 and thereby to raise or lower the safe support frame 129 in a horizontal position. In the illustrated embodiment, the raised or upper position of the frame 129 is such that it allows the feeding means 28 and 29 to individually slip into outlets of the independent storing sections of the safe 22 to make contact with bills.

The lifting mechanism having the above-described construction is operated as follows. When the internal door 25 is opened, the levers 133 are rotated about the fulcrums 133*a* in a direction indicated by an arrow G to thereby move the links 132 as indicated by an arrow H. The lines 132 in turn causes the points of connection 135*a* of the levers 135 to lower, thus resulting in the safe support frame 129 being lowered as indicated by an arrow C. When the internal door 25 is closed, the levers 133 are rotated about the fulcrums 133*a* in a direction of arrow D to thereby move the link 132 as indicated by an arrow E. As a result, the points of connection 135*a* of levers 135 are raised in a direction indicated by an arrow F and thereby lift the safe support frame 129 in a horizontal position. While the lifting mechanism has been shown and described as being interlocked with the internal door 25, it may alternatively be constructed independently of the internal door 25.

Referring to FIGS. 7 to 12, the manifold safe 22 includes a top-open casing 54 the interior of which is partitioned into a first storing section 23 and a second storing section 24. Right and left sensing holes 52 and 53 are formed through the front wall of the casing 54. A lid 200 is openably mounted on the top of the casing 54. A support plate 55 is fixed in place at one end of the first storing section 23. A movable presser plate 56 is constantly urged by a spring or similar biasing means, not shown, to press against the support plate 55 ¥10,000 bills 202 which are accommodated in the compartment 23. Regulating plates 59 and 60 for regulating the width of bills are respectively disposed in mounting portions 57 and 58 which individually extend along the opposite inner surfaces of the casing 54. A support plate 61 is located at one end of the second storing section 24 while a movable presser plate 62 is positioned to cooperate with the support plate 61. Specifically, the presser plate 62 is constantly urged by a spring or similar biasing means, not shown, to press ¥1000 bills 204 accommodated in the compartment 24 against the support plate 61. Movable regulating plates 63 and 64 are also disposed in the mounting sections 57 and 58, respectively.

Figure 7:
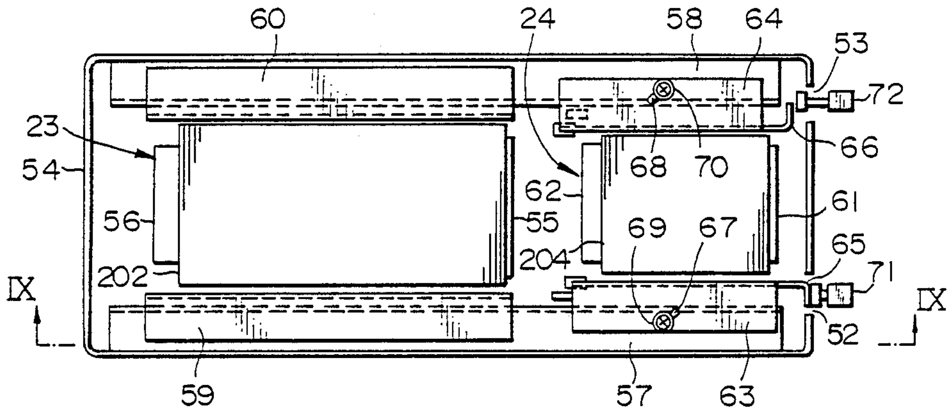
FIG. 7 is a plan view of the safe of an embodiment in which two different kinds of bills are stored.
Figure 8:
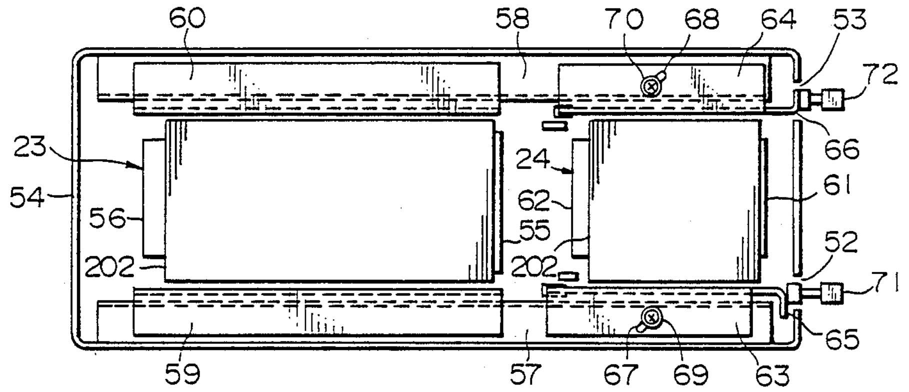
FIG. 8 is a view similar to FIG. 7, showing the safe which is loaded with bills of the same kind.
Figure 9:
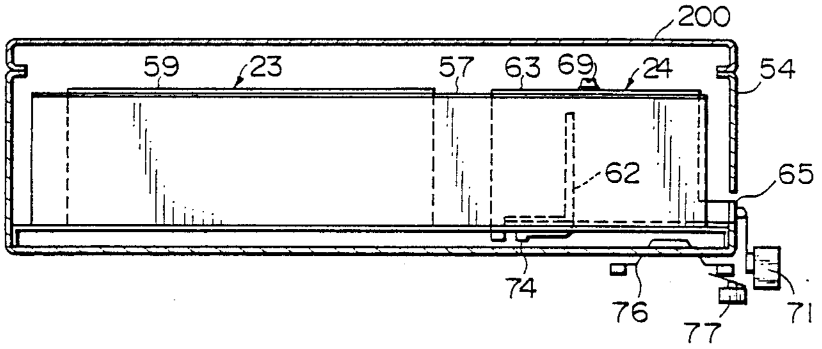
FIG. 9 is a section along line IX—IX of FIG. 7.
Figure 10:
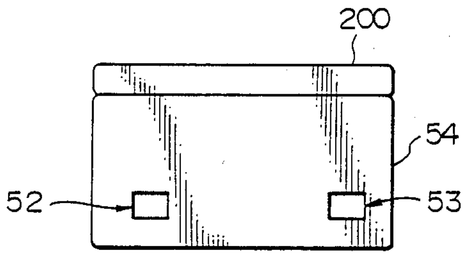
FIG. 10 is a front view of the safe as seen from the right of FIG. 7.
Figure 11:
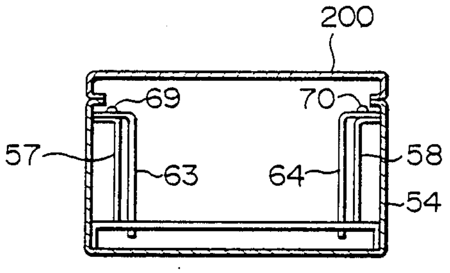
FIG. 11 is a sectional side elevation viewed from the right of FIG. 7, schematically showing the interior of the safe.

The regulating plates 59 and 60 associated with the first storing section 23 each comprises a horizontal portion and a vertical portion. The vertical portions of the plates 59 and 60 are respectively fixed in place in the mounting sections 57 and 58 to define a predetermine distance therebetween. On the other hand, the movable regulating plates 63 and 64 associated with the second storing section 24 include respective, generally L-shaped lugs 65 and 66 in addition to horizontal and vertical portions which are best shown in FIG. 11, each lug 65 or 66 extending from one end of the associated vertical section. The horizontal portions are individually formed with elongate slots 67 and 68. Screws 69 and 70 are respectively passed through the slots 67 and 68 so as to fasten the regulating plates 63 and 64 to the mounting sections 57 and 58. The screws 69 and 70 may be loosened to move the regulating plates 63 and 64 in an obliquely forward or rearward direction to increase or decrease the spacing therebetween as desired, the slots 67 and 68 serving as guides. More specifically, when the regulating plates 63 and 64 are fastened by the screws 69 and 70 in those positions where the screws 69 and 70 abut respectively against the outermost ends of the slots 67 and 68, the distance between the regulating plates 63 and 64 is smaller than the distance between the regulating plates 59 and 60 and substantially equal to the width of ¥1000 bills 204, as shown in FIG. 7. Conversely, when the regulating plates 63 and 64 are fastened by the screws 69 and 70 in those positions where the screws 69 and 70 abut respectively against the innermost ends of the slots 67 and 68, the distance between the regulating plates 63 and 64 is the same as the distance between the regulating plates 59 and 60 and substantially equal to the width of ¥10,000 bills 202, as shown in FIG. 8.

Switches 71 and 72 constitute means for sensing the kind of bills stored, FIG. 13, as will be described in detail later. The switches 71 and 72 are positioned in alignment with the sensing holes 52 and 53 of the casing 54, respectively. When the lugs 65 and 66 of the movable regulating plates 63 and 64 advance into their associated sensing holes 52 and 53, they press movable levers of the switches 71 and 72 to turn on the latter. In this construction, when the distance between the movable regulating plates 63 and 64 is reduced, the lug 65 of the regulating plate 63 advances into the associated sensing hole 52 while, at the same time, the lug 66 of the regulating plate 64 retracts into the casing 54, as shown in FIG. 7. This turns on the switch 71 and turns off the switch 72. When the distance between the regulating plates 63 and 64 is increased, the lug 65 of the regulating plate 63 retracts into the casing 54, as shown in FIG. 8. Hence, the switch 71 is turned off and the switch 72 is turned on.

In this particular embodiment, ¥10,000 bills are stored in the first storing section 23 of the manifold safe 22. In the second storing section 24, the distance between the regulating plates 63 and 64 may be increased or decreased to accommodate bills the width of which corresponds to the resulting distance. The ON-OFF states of the switches 71 and 72 are determined by a controller 51 so that a customer may receive a desired amount of money either in one kind of bills or in two kinds of bills.

Figure 12:
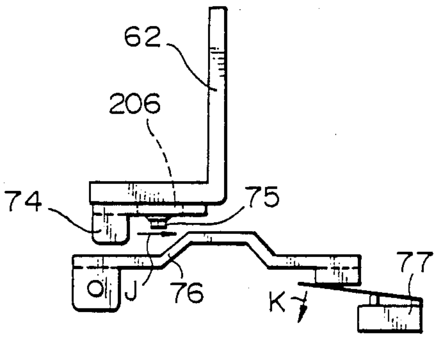
FIG. 12 shows a near-end sensing mechanism associated with the safe.

In FIG. 12, a switch driving member 74 is fastened to the lowermost portion of the presser plate 62 by a screw 75 which is passed through a slot 206 of the driving member 74. An actuator 76 is disposed in a bottom portion of the casing 54 in such a manner as to be rotatable about one end thereof. A switch 77 is positioned to face the other end of the actuator 76. These members 74, 76 and 77 constitute near-end sensing means 78, FIG. 13. In operation, as the switch driving member 74 is moved together with the presser plate 62 in a direction indicated by an arrow J, the member 74 urges the actuator 76 downward with the result that the other end of the actuator 76 is rotated as indicated by an arrow K to turn on the switch 77. The resulting output of the switch 77 is representative of a "near-end" condition in which the amount of bills 202 or 204 remaining in the storing section 24 in scarce.

As previously stated, the switch driving member 74 is formed with the elongate slot 206 which extends in the direction of movement of the member 74. The position of the switch driving member 74 is variable relative to the presser plate 62 within the range of the length of the slot 206. Hence, the setting of near-end detection associated with the bills which are stored in the second storing section 24 is selectable as desired within the range of the maximum number of bills which the cash dispenser can dispense for each payment. More specifically, as the bills are sequentially fed out of the storing section 24, the presser plate 62 is moved in the direction J. By changing the position of the switching member 74 relative to the presser plate 62, therefore, it is possible to change the position of the presser plate 62 relative to the position where the switch driving member 74 urges the actuator 76 downward. Although not shown in the figures, such near-end sensing means 78 constituted by members 74 to 77 is also associated with the first storing section 23. Hence, the near-end condition is sensed independently for both of the compartments.

Figure 13:
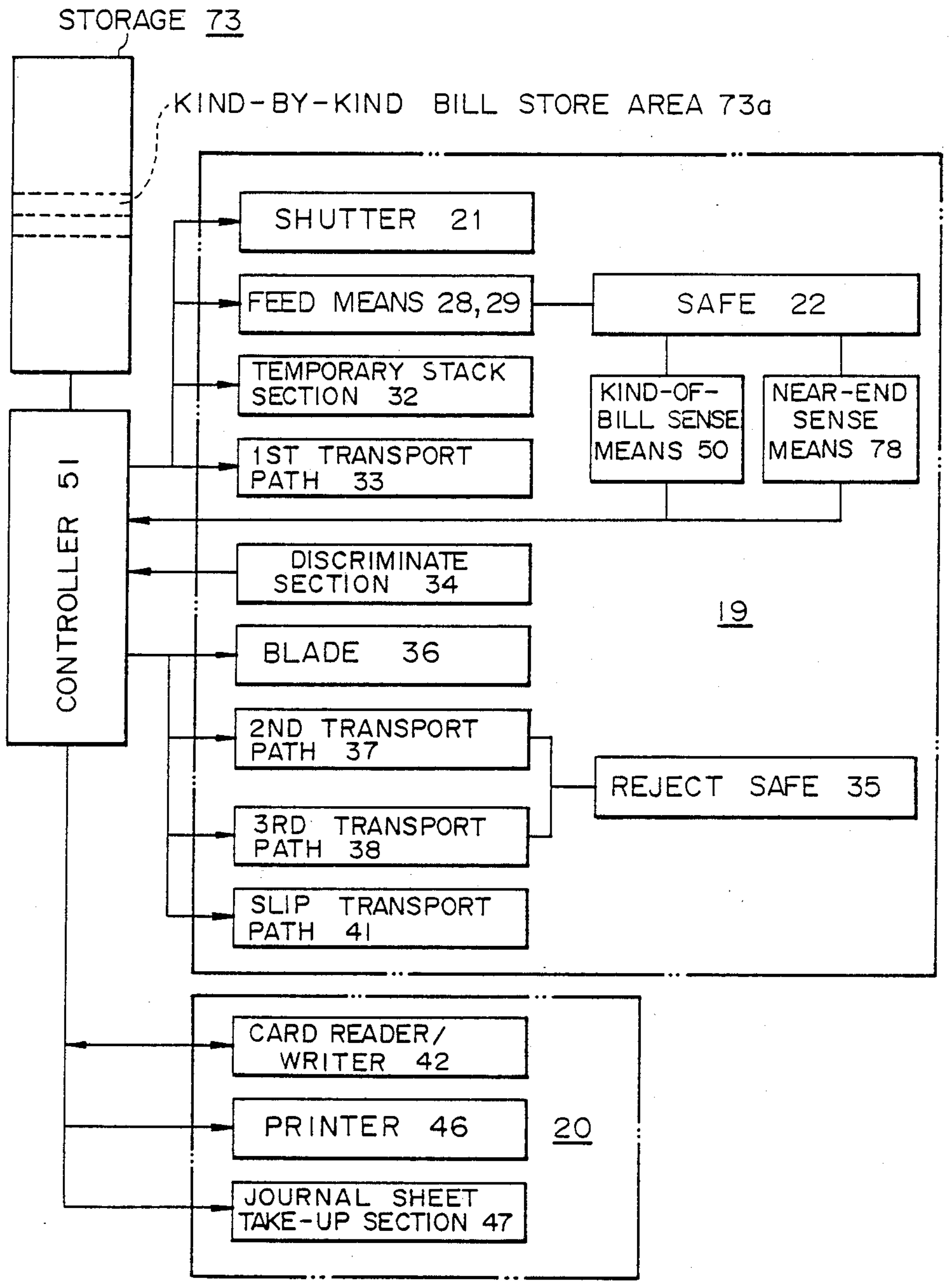
FIG. 13 is a functional block diagram representative of a specific system construction of the embodiment of the invention.

Referring to FIG. 13, a system construction in accordance with the present invention is shown. In this figure, kind-of-bill sensing means 50 is adapted to sense the kinds of bills which are accommodated in the first and second storing sections 23 and 24 of the manifold safe 22. This sensing means 50 is built into the disbursing mechanism 19. A controller 51 is provided for controlling the entire cash dispenser. Specifically, in response to the outputs of the discriminating section 34, card reader/writer 42, operation board 48, kind-of-bill sensing means 50 and other various input elements, the controller 51 controls the operations of the shutter 21, feeding means 28 and 29, first and second stages 30 and 31 of the temporary stacking section 32, first transport path 33, blade 36, second and third transport paths 37 and 38, slip transport path 41, printer 46, journal take-up section 47 and other output elements. A storage such as a memory 73 is also controlled by the controller 51 and includes a kind-by-kind bill data store area 73*a* for storing data representative of the kinds of bills which are accommodated in the compartments 23 and 24 of the safe 22.

A sequence of steps for operating the cash dispenser having the above construction will be described hereinafter.

Before services, bills to be dispensed are packed in the cash dispenser.

LOADING OF MANIFOLD SAFE

To begin with, the first and second storing sections 23 and 24 of the manifold safe 22 are individually loaded with specific kinds of bills. In this particular embodiment, the storing sections 23 and 24 are loaded with ¥10,000 bills 202 and ¥1000 bills 204, respectively. The safe 22 accommodating such bills is inserted into the path 126 after opening the internal door 25. When the internal door 25 is opened, the levers 133, FIG. 5, are rotated about the fulcrums 133*a* in the direction G so that the lift levers 135 are caused to lower their connection points 135*a*. Consequently, the safe support frame 129 is lowered to a position just above the path 126, allowing the safe 22 to be inserted into the frame 129.

As the safe 22 is inserted as far as a predetermined position with its guide blocks 131, FIG. 6, individually mating with the guide rails 130, it is locked in such predetermined position of the safe support frame 129 by locking means, not shown. When the internal door 25 is closed, the levers 133 are rotated about the fulcrums 133*a* in the direction D to move the links 132 in the direction E. Consequently, the lift levers 135 raise the points of connection 135 and thereby the entire safe support frame 129. Then, the feeding means 28 and 29 which are fixed in place slip respectively into the outlets of the first and second storing sections 23 and 24 to abut against the bills stored therein. The cash dispenser is now ready to dispense bills in response to a customer's operation.

A disbursing procedure of the illustrative embodiment is as follows.

PAYMENT

Figure 14:
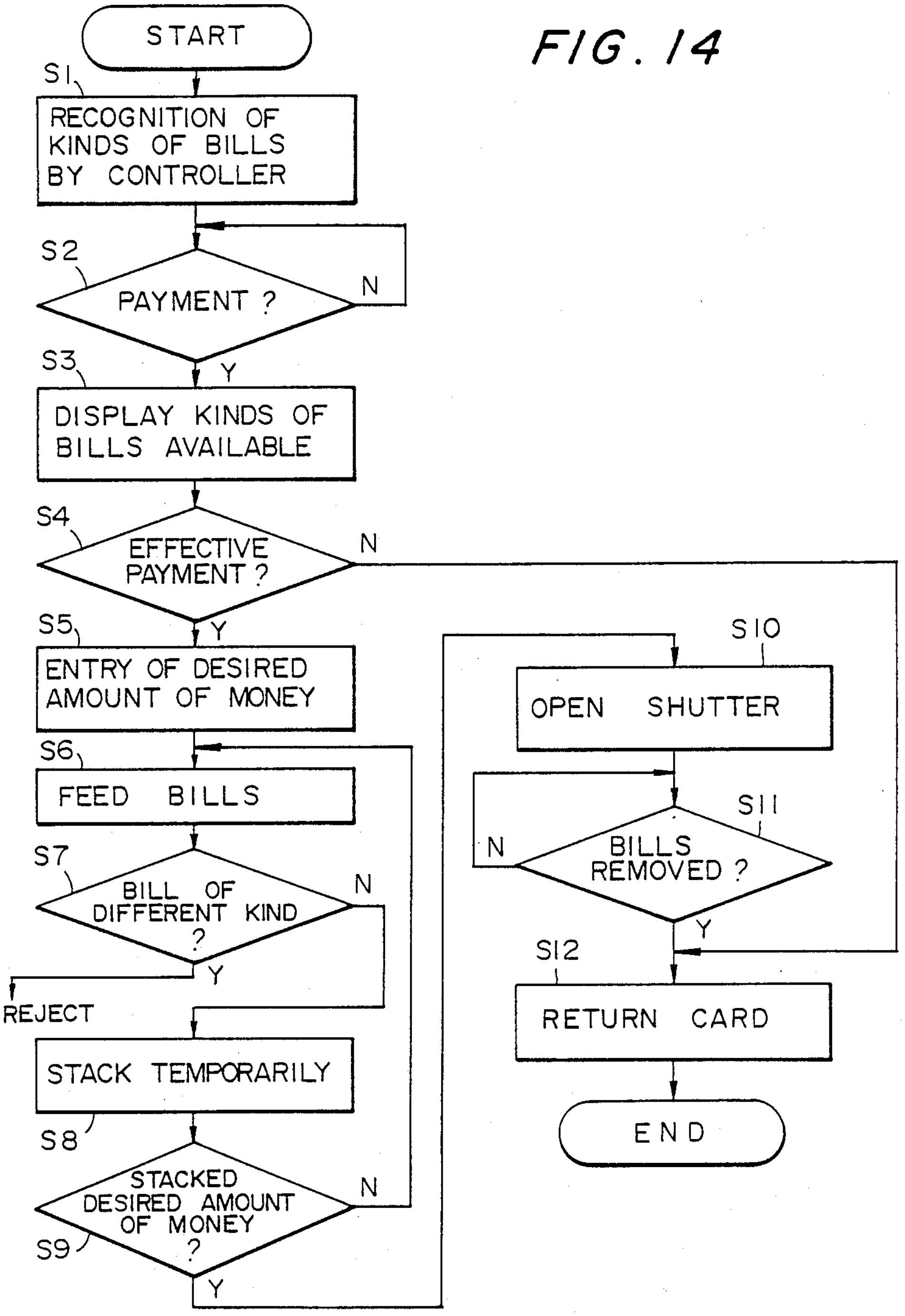
FIG. 14 is a flowchart demonstrating a specific operation of a controller which is included in the system construction of FIG. 13.

Payment will be described with reference mainly made to FIG. 14. In FIG. 14, the S letter is representative of process steps. The following description will be made according to the order of such process seps.

Step S1

When a power switch, not shown, of the cash dispenser is turned on, the controller 51 determines the kinds of bills to be handled on the basis of the outputs of the switches 71 and 72 which constitute the kind-of-bill sensing means 50. For example, if the switch 71 has an ON state and the switch 72 has an OFF state, the controller 51 decides that the first and second storing sections 23 and 24 of the safe are respectively loaded with ¥10,000 bills 202 and ¥1000 bills 204, as shown in FIG. 7. The controller 51 therefore recognizes that bills available for payment are such two different kinds of bills. If the switches 71 and 72 have an OFF state and an ON state, respectively, the controller 51 decides that both of the compartments 23 and 24 of the safe 22 are filled with ¥10,000 bills 202, as shown in FIG. 8. Then, the controller 51 sees that only one kind of bills, i.e., ¥1000 bills, are available for payment. The result of such a decision is stored in the kind-by-kind bill data store area 37*a* of the storage 73.

Step S2

The controller 51 determines whether a pay key on the operation board 48, FIG. 3, has been pressed by a customer. If it has not been pressed, the controller 51 sets up a waiting or idle state.

Step S3

Based on the result of the decision of Step S1, the controller 51 shows on the display 49 the kinds of bills with which the cash dispenser is operable.

Step S4

A customer recognizes the information on the display 49, inserts a card 43 into the card inlet/outlet 17 and then manipulates the keys on the operation board 48 to enter a code. Then, the card reader/writer 42 pulls in the card 43, reads data from the card 42, and delivers the data to the controller 51 together with the code entered in the operation board 48. In response, the controller 51 transfers the card data and code as a pack of customer data to a central station and, based on a result of comparison returned from the central station, determines whether the request for payment is valid. More specifically, the controller 51 sees if the transaction to occur is legitimate on the basis of whether the card data and code are filed as single customer data in the central station. The program advances to a step S12 if the request for payment is not valid and to a step S5 if it is valid.

Step S5

The controller 51 causes the display 49 to provide a message for urging the customer to enter a desired amount of money as well as other data. Guided by the message, the customer manipulates keys on the operation board 48 to input the desired amount of money and other data.

Step S6

In response to the data entered, the controller 51 drives the feeding means 28 or 29 so that bills are sequentially fed out of the first storing section 23 or the second storing section 24 of the safe 22 one by one. More specifically, assuming that only one kind of bills are available for payment, the controller 51 selects one of the two storing sections 23 and 24 of the safe 22 depending upon predetermined conditions such as those associated with the bills stored in the compartments 22 and 23. On the other hand, when two different kinds of bills are available, the controller 51 selectively drives the feeding means 28 and 29 on the basis of the kind and amount of money which have been entered on the operation board 48. In such a case, one or both of the ¥10,000 bills 202 and the ¥1000 bills 204 are fed out. In the event that both of the bills 202 and 204 are delivered, the bills of one kind are fed first and then the bills of the other kind each in a designated amount.

Step S7

The bills fed by the feeding means 28 and/or 29 are conveyed along the first transport path 33. The discriminating section 34 located on the first transport path 33 discriminates the bills with respect to their kind while checking them for overlap feed, skew or similar occurrences. An output of the discriminating section 34 is fed to the controller 51. In response, the controller 51 determines whether the kind of bills identified by the discriminating section 34 conform to the previously stated recognition of the available kinds of bills. During the feed of ¥10,000 bills, for example, the controller 51 determines ¥1000 bills which may have slipped among the ¥10,000 bills to be alien.

Step S8

Normal bills of correct kinds and free from defects as determined by the controller 51 are counted and further driven to the end of the first transport path 33. At the end of the first transport path 33, those bills are transferred to the first stage 30 of the temporary stacking section 32 to be piled up for a short period of time. In this instance, the upper transport belt 40 of the third transport path 38 has already been rotated counterclockwise as viewed in FIG. 4 away from the lower transport belt 39. On the other hand, bills determined to be alien with respect to kind, bills the kind of which cannot be identified, and defective bills unable to be counted or suffered from skew or overlap feed are redirected by the blade 36 into the second transport path 37 while being transported along the first transport path 33 toward the temporary stacking section 32. The second transport path 37 conveys such bills into the reject safe 35. By such a procedure, only normal bills are sequentially piled up on the first stage 30 of the temporary stacking section 32.

Step S9

The controller 51 sees if the bills temporarily stacked on the first stage 30 correspond to the amount and number of bills which are requested by the customer. If the result of this decision is "NO", the program repeats the procedure which begins at step S7. If the result is "YES", the operation is transferred to a step S10.

Step S10

Particulars of the account are printed by the printer 46 on the webbing of paper 44, and the resulting slip 45 is cut by a cutter, not shown. The slip 45 is fed into the slip transport path 41 and conveyed thereby to the second stage 31 of the temporary stacking section 32. At this time, the upper transport belt 40 of the third transport path 38 is rotated clockwise as viewed in FIG. 4 into contact with the lower transport belt 39. At the same time, the first stage 30 is lowered or retracted from the position A to the position B. As a result, the stack of bills on the first stage 30 and the slip 45 on the second stage 31 are held together between the upper and lower transport belts 39 and 40. As the bills and slip are conveyed by the coactive belts 39 and 40 as far as the bill outlet 16 of the cash dispenser, the shutter 21 is opened by suitable means, not shown, to allow the bills and slip to be presented to the customer through the outlet 16.

Step S11

The controller 51 determines whether the customer has picked up the bills from the bill outlet 16 by referencing, for example, an output of a sensor which may be disposed in the bill outlet 16. If the answer is "YES", the controller 51 closes the shutter 21 and then executes a step S11. If otherwise, it waits until the customer removes the bills. If a predetermined period of time expires before the customer pick up the bills, i.e., when the customer has forgotten to pull them out, the bills are conveyed in the reverse direction with the slip by the belts 39 and 40 of the third transport path 38. At the other end of the belts 39 and 40, such bills and slip are deposited into the reject safe 35. At this instant, the shutter 21 is closed.

Step S12

The card 43 is ejected through the card outlet 17 to be returned to the customer, completing the entire transaction.

Figure 15A:
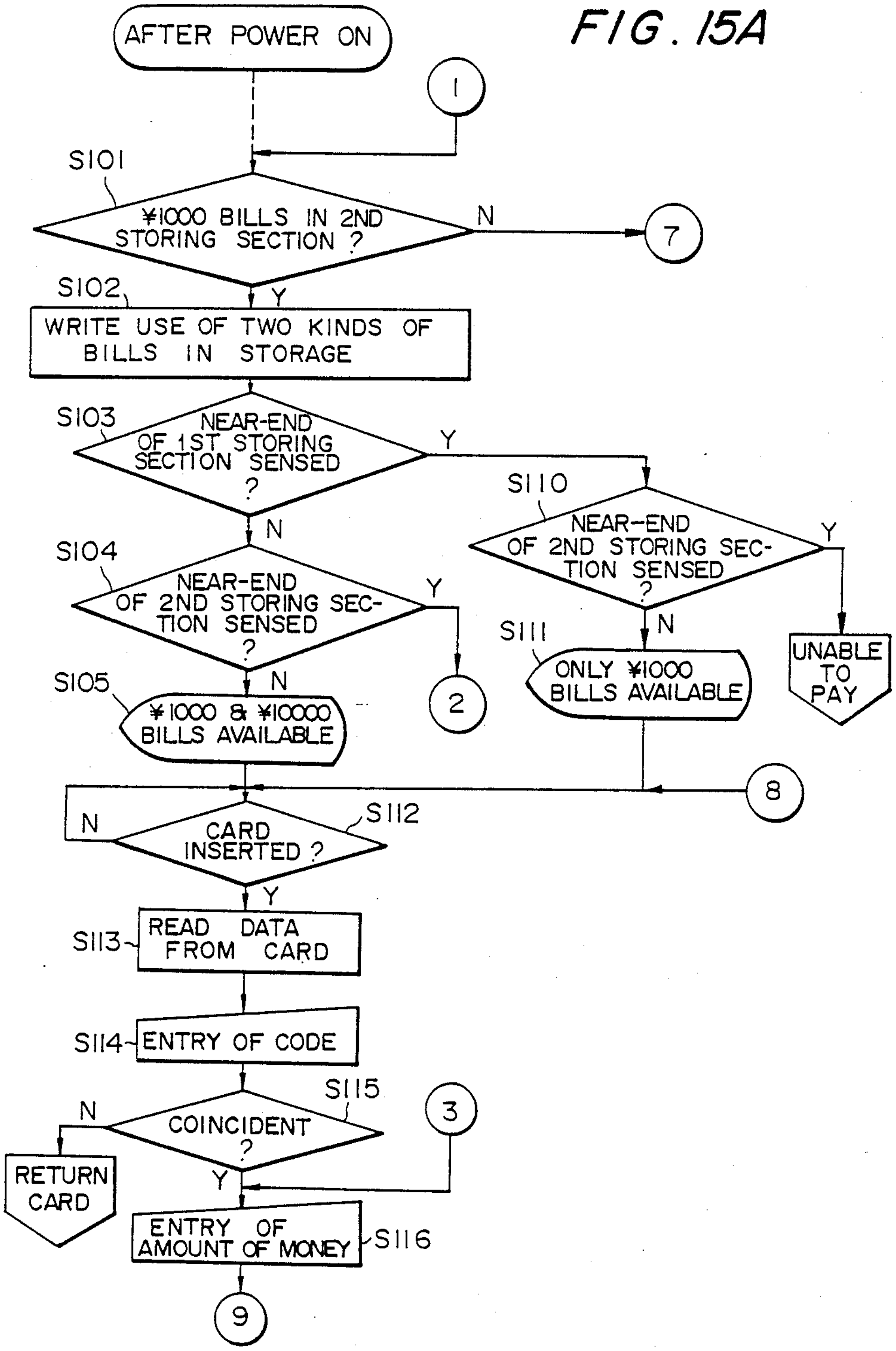
FIGS. 15A to 15E are flowcharts demonstrating a specific procedure for near-end detection in the same system.

Hereinafter will be discussed near-end detection which is particular to the illustrated embodiment of the present invention with reference to FIGS. 15A–15. First, an attendant authorized to operate the cash dispenser adjusts the position of the switch driving member 74 shown in FIG. 12 such that the switch 77 senses a near-end state when the number of bills stored in the second storing section 24 of the safe 22 is reduced to a desired number smaller than the maximum number of bills which can be dispensed for one transaction. For example, assuming that the maximum number of bills that can be dispensed is fifty, the switch driving member 74 may be so positioned as to turn on the switch 77 via the actuator 76 when the number of bills remaining in the second storing section 24 reaches a certain which is smaller than fifty, e.g. twenty.

Step S101

As previously stated, when the switches 71 and 72 of the kind-of-bill sensing means 50 have an ON state and an OFF state, respectively, the controller 51 sees that the second storing section 24 is loaded with ¥1000 bills 204. When the switch 71 has an OFF state and the switch 72 has an ON state, they show that the compartment 24 is loaded with ¥10,000 bills 202. Determining the kind of bills accommodated in the compartment 24, the controller 51 executes a step S102 if the bills are ¥1000 bills and a step S106 if they are Y10,000 bills.

Step S102

The controller 51 memorizes the availability of two different kinds of bills by writing data "02", for example, in the kind-of-bill data store area of the storage 73.

Step S103

In response to an output of the near-end sensing means 78, the controller 51 determines whether the near-end state of bills stored in the first storing section 23 has been sensed. The program is transferred to a step S110 if the near-end state has been sensed and to a step S104 if it has not been sensed.

Step S104

The controller 51 responds to an output of the switch 77 shown in FIG. 12 for determining whether a near-end state of bills stored in the second storing section 24 has been sensed. The controller 51 executes a step S109 if the near-end state has been sensed and to a step S105 if it has not been not.

Step S105

The controller 51 informs a customer that both of ¥1000 bills and ¥1000 bills are available by using the display 49.

Step S106

When the controller 51 has decided that the ¥10,000 bills 202 are present in the second storing section 24, it memorizes the availability of only one kind of bills by writing suitable data such as "01" in the kind-of-bill data store area *73a* of the storage 73.

Step S107

As in the step S103, the controller 51 determines whether a near-end state of the bills present in the first storing section 23 has been sensed. It performs a step S108 if the near-end state has been detected and a step S109 if it has not been sensed.

Step S108

As in the step S104, the controller 51 determines whether a near-end state of the bills present in the second storing section 24 has been sensed. If the near-end state has not been sensed, the program advances to a step S109. If the near-end state has been sensed, the program stops the operation of the cash dispenser determining that an "unble-to-pay" condition has occurred. Simultaneously, alerting means, not shown, is energized to alert an attendant to the occurrence of a near-end state.

Step S109

That the cash dispenser is operable with ¥10,000 bills only is indicated on the display 49.

Step S110

When a near-end state is sensed in the step S103, the controller 51 sees if a near-end state has been sensed in relation to the bills which are loaded in the second storing section 24 as in the step S104. If the near-end state has not been sensed, the controller 51 executes a step S111. If such a condition has been sensed, the controller 51 decides that the unable-to-pay condition has been reached and therefore interrupts the operation of the cash dispenser while energizing the alerting means.

Step S111

The controller 51 shows on the display 49 that although two kinds of bills are available, bills cannot be dispensed except for ¥1000 bills due to the shortage of ¥10,000 bills.

The process steps described so far are executed in the idle condition which occurs immediately after the power switch has been turned on.

Step S112

The controller references an output of sensing means, not shown, which is disposed in the card inlet/outlet 17

FIGS. 3 and 4 for determining whether any customer has inserted a card 43 into the cash dispenser. The program holds the waiting or idle condition if no card 43 has been inserted and advances to a step S113 if the card 43 has been inserted.

Step S113

The card reader/writer 42 draws in the card 43 to read data which are stored in the card 43.

Step S114

The customer manipulates the operation board 48 to key in a code which is stored in the card 43.

Step S115

The controller 51 determines whether the number entered by the customer on the operation board 48 is identical with the code read out of the card 43 by the card reader/writer 42. If the entered number is the same as the stored code, the controller 51 advances to a step S116. However, if they are not identical, the controller 51 returns the card 43 and urges the customer to repeat the operation from the beginning.

Step S116

The customer enters a desired amount of money on the operation board 48.

Step S117

The controller 51 reads out data which is stored in the store area 73*a* of the storage 73 to see the kinds of bills available. If the cash dispenser is currently operated with two kinds of bills, the program advances to a step S120. If only one kind of bills is currently available, a step S118 follows.

Step S118

The controller 51 checks the amount of money entered by the customer to see if any ¥1000 bills are needed. The controller 51 performs a step S119 if any ¥1000 bills are needed and a step S132 if only ¥10,000 bills suffice.

Step S119

The controller 51 informs the customer of the availability of only ¥1000 bills by using the display 49 while displaying a message for urging the customer to reenter the desired amount of money. Then, the program is transferred to the step S116.

Step S120

The controller 51 determines if any ¥10,000 bills are required by checking the amount of money entered by the customer. This step S120 is followed by a step S121 if the payment involves ¥10,000 bills and by a step S123 if it does not involve the same.

Step S121

As in the step S103, the controller 51 determines whether a near-end state of bills present in the first storing section 23 has been sensed. The step is transferred to a step S130 if the near-end state has been sensed and to a step S122 if it has not been sensed.

Step S122

In response to a command from the controller 51, the feeding means 28 feeds a particular number of ¥10,000 bills associated with the entered amount of money out of the first storing section 23 of the safe 22. The bills coming out of the compartment 23 are sequentially conveyed to the discriminating section 34 along the first transport path 33. The discriminating section 34 discriminates the bills with respect to kind on the basis of their dimensions while discriminating counterfeit bills from genuine bills. The bills are further transported by the first transport part 33 away from the discriminating section 34. Only those bills which are of the adequate kind and genuine as determined to be by the discriminating section 34 are piled up on the temporary stacking section 32. The other bills which are alien in kind or determined counterfeit are redirected toward the reject safe 35 along the second transport path 37 by the blade 36 which has been charged over in position.

Step S123

The controller 51 determines whether any ¥1000 bills should be dispensed by referencing the amount of money entered by the customer. This step is followed by a step S124 if the result of decision is "YES" and by a step S126 if it is "NO".

Step S124

As in the step S104, the controller 51 sees if a near-end state of the bills stored in the second storing section 24 has been sensed and, if it has been sensed, executes a step S131. If the near-end state has not been sensed, the step 124 is followed by a step S125.

Step S125

In response to a command from the controller 51, the feeding means 29 feeds a particular number of Y10,000 bills associated with the entered amount of money out of the second storing section 24 of the safe 22. These bills are also conveyed along the first path 33 to the discriminating section 34. The discriminating section 34 discriminates the bills with respect to kind on the basis of their dimensions while discriminating counterfeit bills from genuine bills. The bills coming out of the discriminating section 34 are further driven along the transport path 33. While the bills determined to be of adequate kind and genuine are sequentially stacked on the temporary stacking section 32, the bills of a different kind or counterfeit bills are routed to the reject safe 35 along the second transport path 37 by the blade 36.

Step S126

The controller 51 causes the card read/writer 43 to discharge the card through the card outlet 17.

Step S127

The customer pulls out the card from the card outlet 17.

Step S128

The shutter 21 is opened in response to a command from the controller 51. Then, the pile of bills are conveyed from the temporary stacking section 32 to the bill outlet 16 along the third transport path 38.

Step S129

As the customer picks up the bills and the control section 51 confirms the removal, the shutter 21 is closed and the program returns to the step S101.

Step S130

When a near-end state of the bills stored in the first storing section 23 has been detected at the step S121, the controller 51 causes the display 49 to show that the cash dispenser is operating with ¥1000 bills only due to the shortage of ¥10,000 bills. At the same time, the controller 51 produces a message for urging the customer to reenter the desired amount of money on the display 49. Then, the program returns to the step 116.

Step S131

When a near-end state of the bills in the second storing section 24 has been sensed at the step S124, the controller 51 informs the customer of the availability of ¥10,000 bills only due to the short amount of remaining ¥1000 bills by using the display 49 and, at the same time, produces a message for urging the customer to reenter the desired amount of money. Then, the program returns to the step S116.

Step S132

When only ¥10,000 bills are to be dispensed as decided in the step S118, the controller 51 sees if a near-end state of the bills in the first storing section 23 has been sensed, as in the step S103. The program advances to a step S136 if the near-end state has been sensed and to a step S133 if otherwise.

Step S133

As in the step S122, the controller 51 executes the processing for stacking ¥10,000 bills on the temporary stacking section 32.

Step S134

When a near-end state of the bills in the first storing section 23 has been sensed while the feed of bills as effected in the step S33 is under way, the controller 51 interrupts the feed of bills from the compartment 23 and then advances to a step 135. When the near-end state has not been sensed, the controller 51 returns to the step S126 after ¥10,000 bills the number of which corresponds to the entered amount of money have been stacked up in the temporary stacking section 32. The procedure beginning at the step S126 terminates at the step S129.

Step S135

In response to a command from the controller 51, the remaining or supplementary number of bills are fed from the second storing section 24 and then added to the bills which have been fed from the first storing section 23. As a result, a number of ¥10,000 bills associated with the requsted amount of money are stacked on the temporary stacking section 32. Then, the steps S126 to S129 are repeated.

Step S136

When a near-end state of the bills in the first storing section 23 is sensed at the step S132, ¥10,000 bills 202 are fed from the second storing section 24 as commanded by the controller 51 and then stacked on the temporary stacking section 32. This is followed by the sequence of steps S126 to S129.

In the above-described manner, payment is repeated until the amounts of bills remaining in the first and second storing sections 23 and 24 reaches a prescribed number which is set by the switch driving member 74.

As stated above, after a near-end state of the bills in the first storing section 23 has been sensed, bills are fed out of the second storing section 24. Such changeover from the first storing section 23 to the second storing section 24 may also be effected when the feed of bills from the first section 23 fails for one cause or another.

Figure 16:
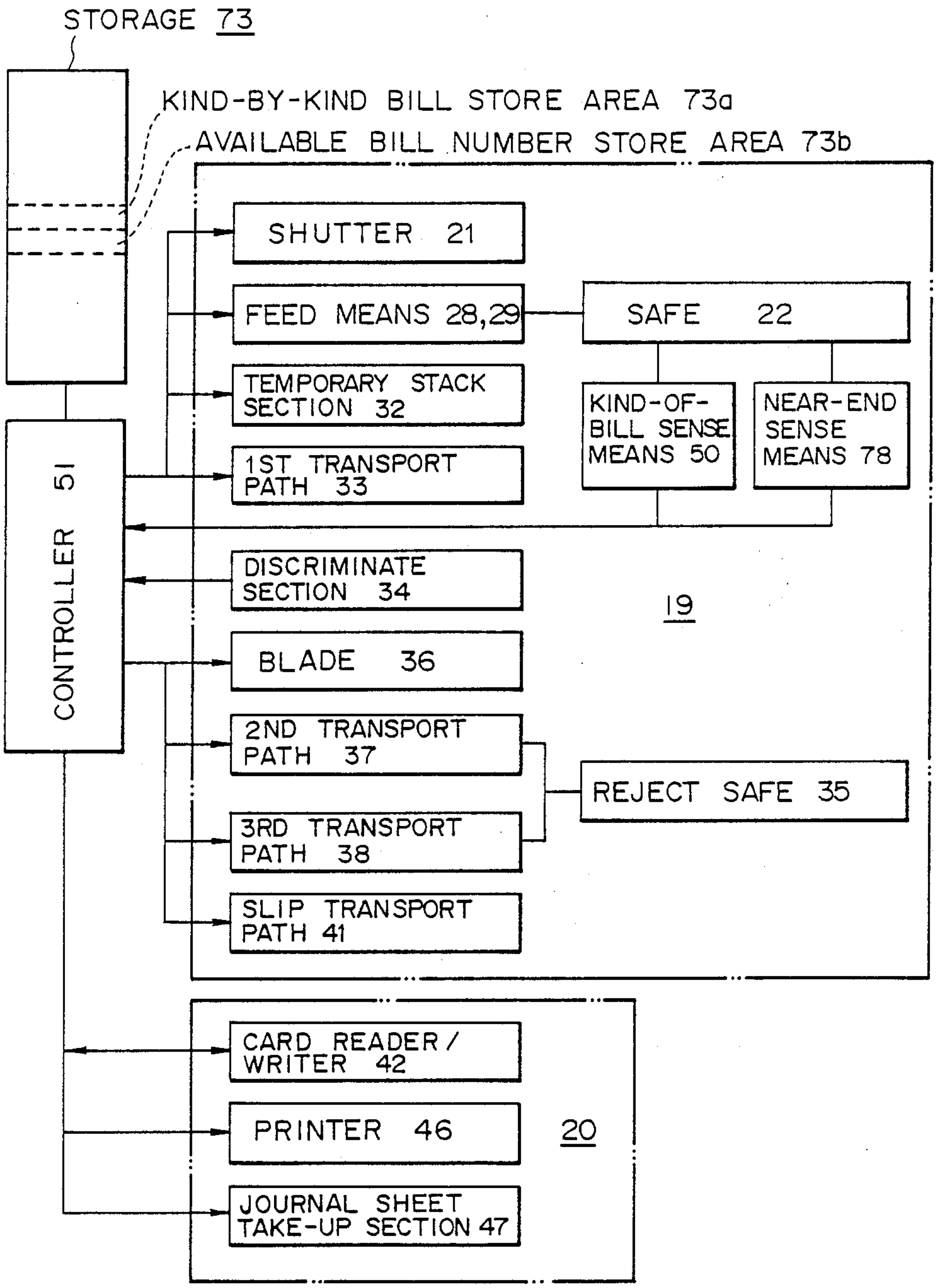
FIG. 16 is diagram similar to FIG. 13, showing an alternative system construction of the embodiment of the invention.

Referring to FIG. 16, an alternative embodiment of the present invention is shown. In this embodiment, near-end sensing means 78 senses a near-end state when the number of bills remaining in the first and second storing sections 23 and 24 equals the number stored in an available bill number store area **73*b* which is defined in the storage 73. The near-end sensing means 78 is also built in the disbursing mechanism 19. The available bill number store area 73*b* serves as means for storing the number of bills which can be fed out of the first and second storing sections 23 and 24** after the near-end condition has been sensed, within the range of the maximum number of bills which can be dispensed for one transaction and preset as an initial value.

The available number of bills may be stored in the area **73*b* of the storage 73 by using the operation board 48 at the time when the safe 22 loaded with bills is mounted in the cash dispenser. While the number concerned is preferably about 70 percent of the maximum number of bills which can be dispensed for one transaction, it is of course open to choice and may be determined as desired by a user. The rest of the construction is identical with the system construction which has been discussed with reference to FIG. 13**.

Figure 15C:
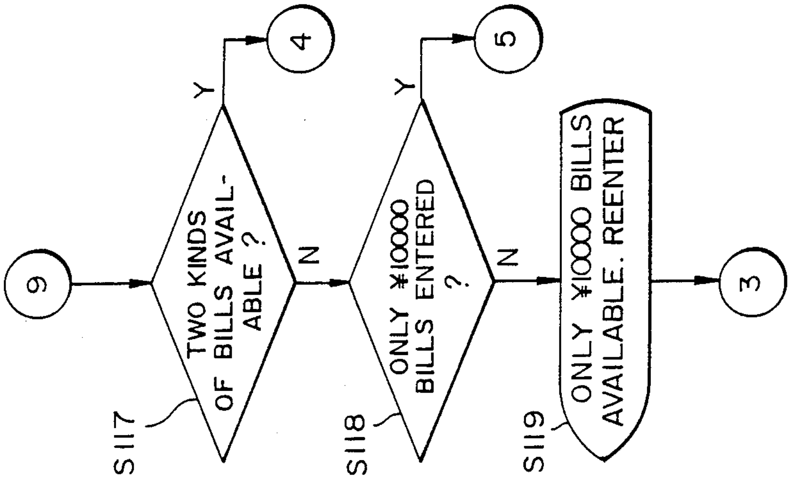
Figure 15B:
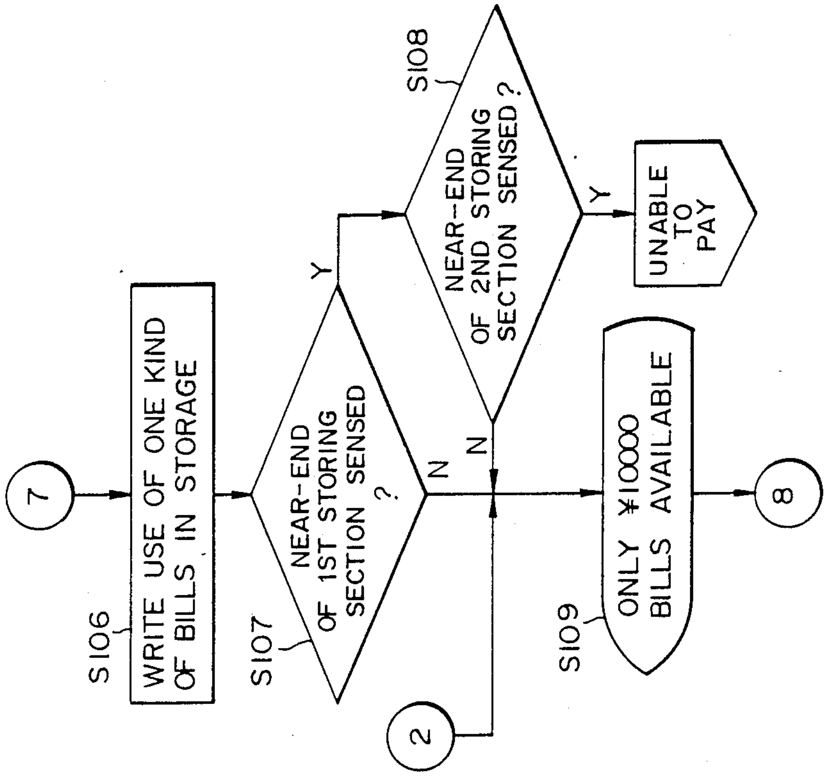
Figure 15D:
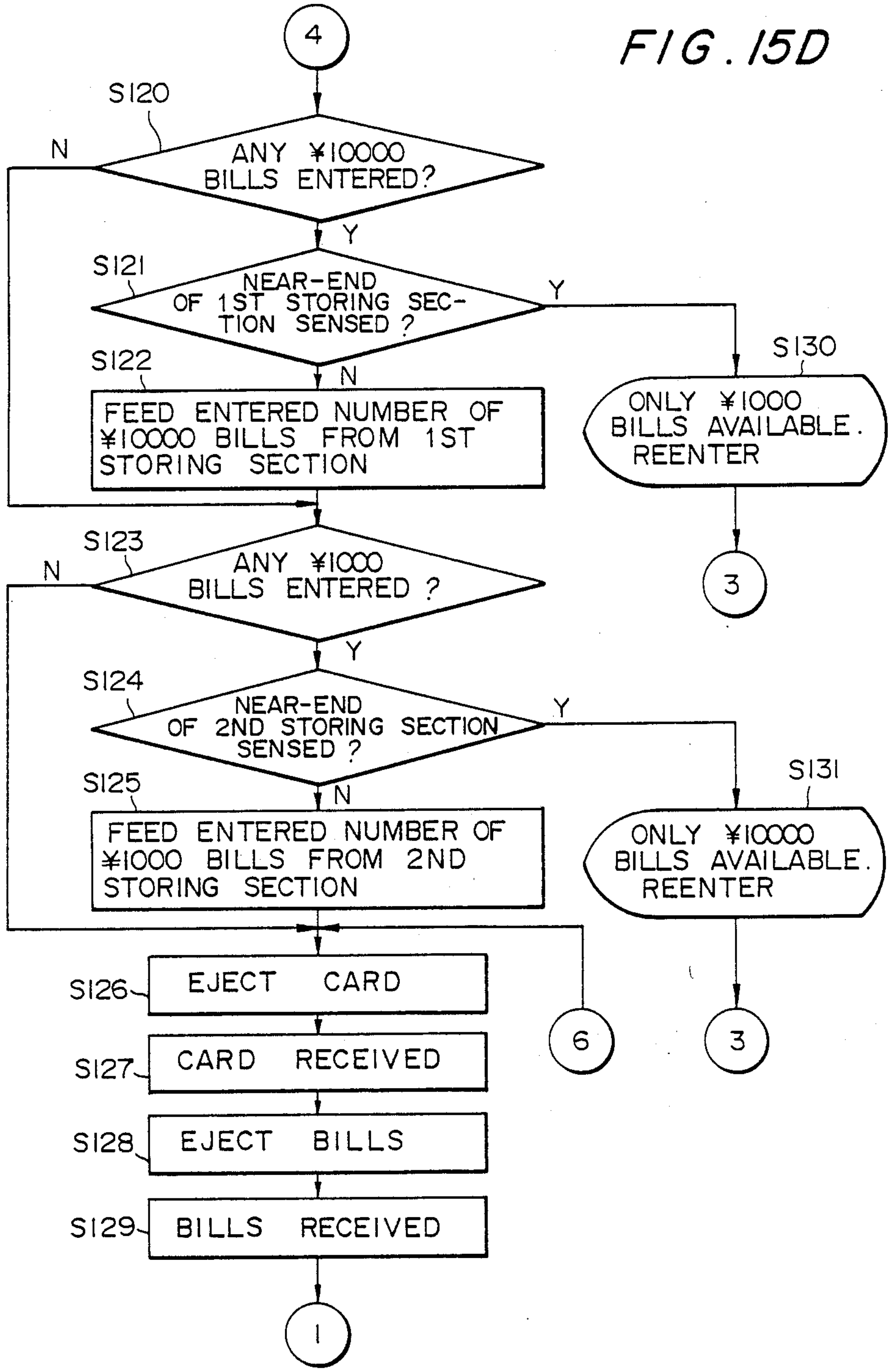
Figure 15E:
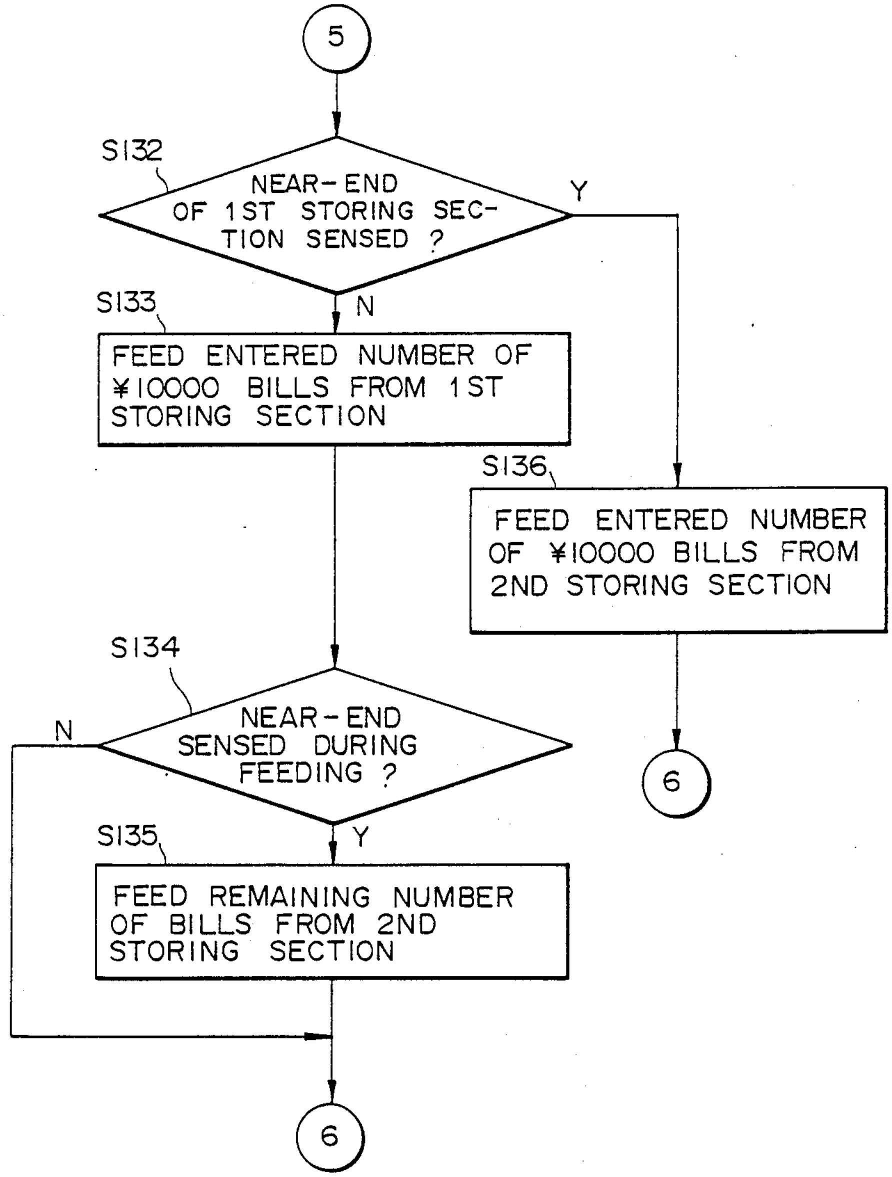
Figure 17A:
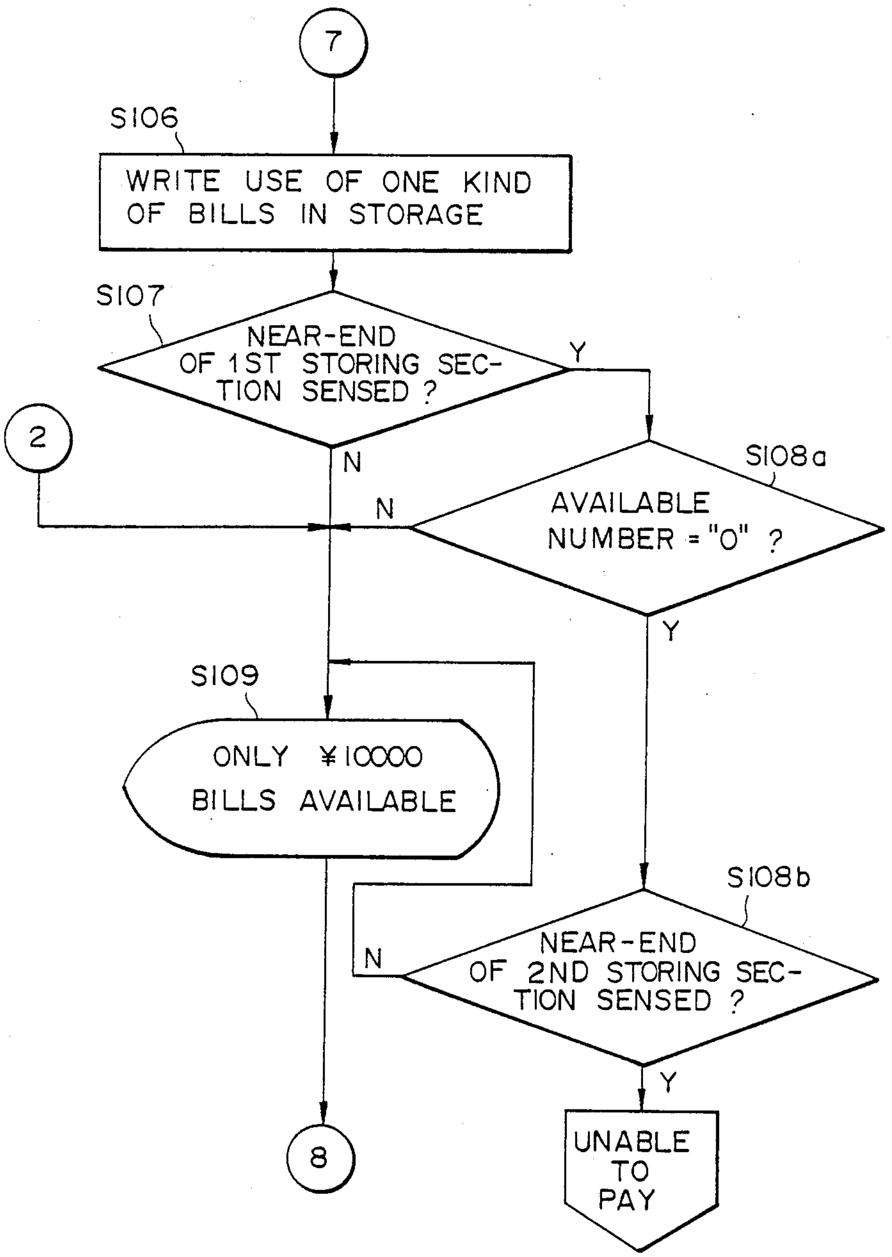
FIGS. 17A and 17B are flowcharts showing a specific operation of a controller included in the system construction of FIG. 16 and being respectively connected to FIGS. 15A and 15C and 15D in place of FIGS. 15B and 15E.

In operation, in the system shown in FIG. 16, the step S107 of FIG. 15B is transferred to a step **S108*a* of FIG. 17A when a near-end condition is sensed in the step S107. If a near-end condition is not sensed in the step S107, the program advances to the step S109**.

Step **S108*a***

The controller 51 reads the available number of bills out of the area **73*b* of the storage 73 to see if it is zero. If the number read out is zero, the step S108*a* is followed by a step S108*b*. If it is not zero, the program is transferred to the step S109**.

Step **S108*b***

As in the step S104, the controller 51 determines whether a near-end state of the bills in the second storing section 24 has been sensed and, if it has not been sensed, the program is transferred to the step S109. If the near-end state has been sensed, the controller 51 stops the operation of the cash dispenser on the unable-to-pay basis while alerting an attendant to the near-end condition.

Figure 17B:
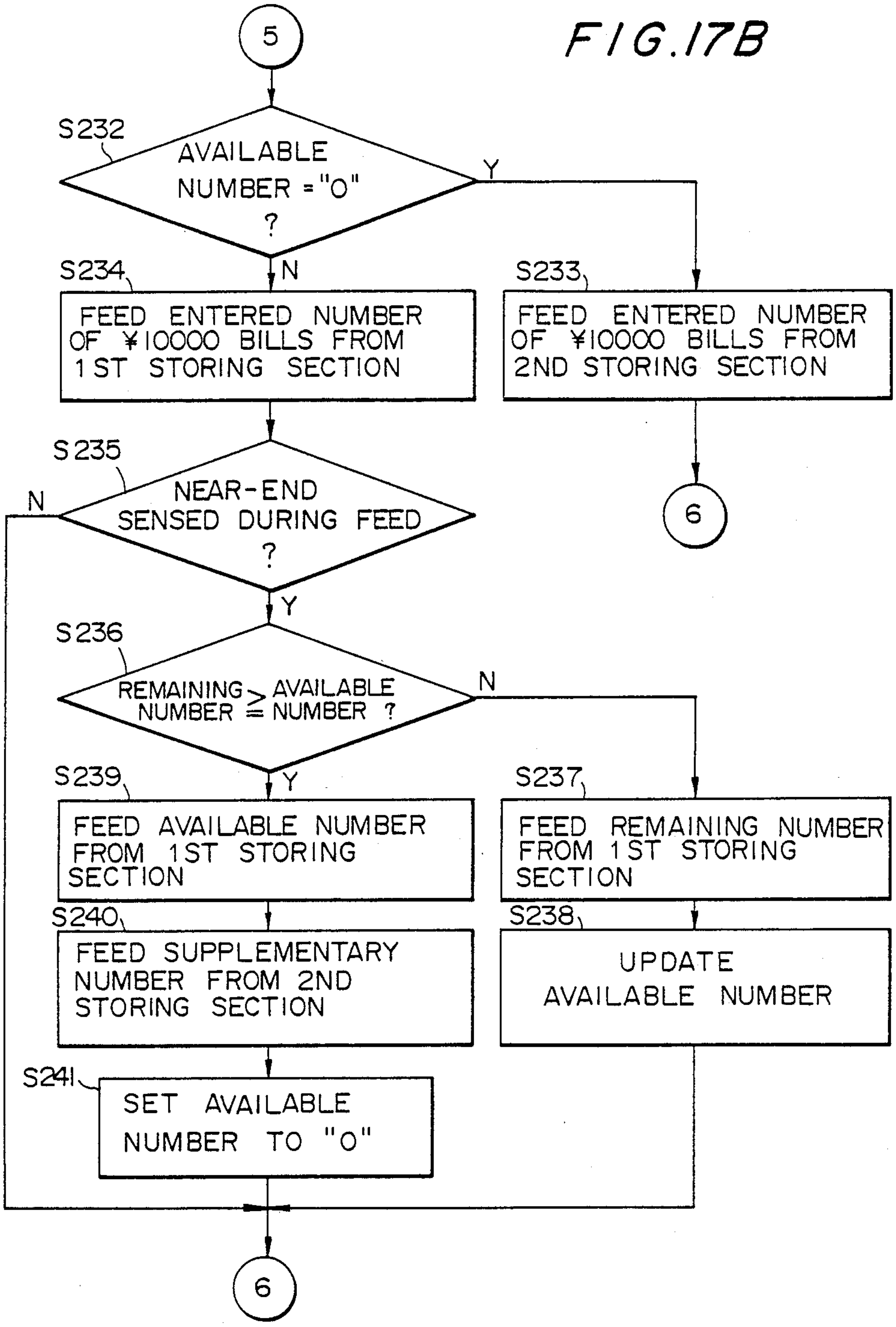

Further, in the system construction shown in FIG. 16, the step S118 of FIG. 15C is transferred to a step S232 of FIG. 17B if the entered amount of money involves ¥10,000 bills only.

Step S232

The controller 51 reads the available number of bills out of the area **73*b* of the storage and, if it is zero, advances to a step S233. If the number is not zero, the operation is transferred to a step S234**.

Step S233

In response to a command from the controller 51, ¥10,000 bills are sequentially fed out of the second storing section 24 to be stacked on the temporary stacking section 32 as in the step S125. The step S233 is transferred to the sequence of steps S126 to S129.

Step S234

As in the Step S122, the controller 51 causes ¥10,000 bills to be sequentially fed out of the first storing section and stacked on the temporary stacking section 32.

Step S235

When a near-end state of the bills in the first storing section 23 is sensed while the feed of bills in the step S234 is under way, the program advances to a step S236. If a near-end state is not sensed, the step S235 is transferred to the sequence of steps S126 to S129 after a particular number of ¥10,000 bills associated with the requested amount of money has been stacked in the temporary stacking section 32.

Step S236

The controller 51 subtracts the number of ¥10,000 bills fed in the step S234 from the number associated with the entered amount of money and compares the remainder with the available number of bills stored in the area **73*b* of the storage 73. If the remainder is greater than the stored number, the program advances to a step S239; if the former is equal to or smaller than the latter, the program advances to a step S237**.

Step S237

The controller 51 causes ¥10,000 bills to be continuously fed out from the first storing section 23 until the remainder becomes zero and stacked in the temporary stacking section 32.

Step S238

The controller 51 subtracts the number of supplementary bills fed in the step S237 from the value read out of the area 73*b* of the storage 73, enters the resulting value in the area 73*b*, updates the available number of bills, and repeats the sequence of steps S126 to S129.

Step S239

The controller 51 causes all the ¥10,000 bills stored in the first storing section 23 to be fed out and stacked on the temporary stacking section 32.

Step S240

The controller 51 subtracts the number of bills fed in the step S239 from the previously mentioned remainder to determine how many ¥10,000 bills have to be supplemented to fullfill the requested amount of money. Then, the controller 51 causes supplementary ¥10,000 bills to be delivered from the second storing section 24. The bills from the second storing section 24 are stacked on the bills from the first storing section 23 in the temporary stacking section 32, whereby the desired amount of money is prepared.

Step S241

The controller 51 enters a value of zero in the area 73*b* of the storage 73 to memorize that no bill can be fed from the first storing section 23. The step S241 is transferred to the step S126 to repeat the same sequence which terminates at the step S129.

In this manner, the controller 51 allows bills to be dispensed until near-end of bills in the first and second storing sections 23 and 24 has been sensed.

In summary, when the cash dispenser of this particular embodiment is operable with a single kind of bills and after a near-end state of bills in the first storing section 23 has been sensed, all the bills in the first storing section 23 are fed out and then the second storing section 24 is substituted for the first storing section 23. Such substitution of the second storing section 24 for the first storing section 23 may also be effected when some trouble occurs in the feed of bills from the first storing section 23.

In the event that the bills in the manifold safe 22 run out or the need for close inspection of the bills arises while the payment is repeated, an attendant opens the internal door 25 for the purpose of dismounting the safe 22 from the cash dispenser. Then, the lifting mechanism interlocked with the door 25 lowers the safe support frame 129, FIG. 5, so that the feeding means 28 and 29 are disengaged from the outlets of the first and second storing sections 23 and 24. As soon as the safe 22 is lowered to a position above the insertion path 126, the locking means, not shown, is released. Then, the safe 22 is ready to be pulled toward the internal door 25 out of the disbursing mechanism 19. After the necessary operation such as loading the safe 22 with bills or inspecting the bills has been finished, the safe 22 is loaded again in the disbursing mechanism by the previously stated procedure.

While the present invention has been described with reference to the particular illustrative embodiments, it is not to be restricted by those embodiments but only by the appended claims. It is to be appreciated that those skilled in the art could change or modify the illustrated embodiments without departing from the scope of and spirit of the present invention. For example, the switches 71 and 72 coactive with the movable regulating plates 63 and 64 of the second storing section 24 for sensing the kind of bills may be replaced with photosensors, magnetic sensors or any other suitable sensors. The regulating plates 59 and 60 associated with the first storing section 23 may also be provided with an implementation for changing their distance and combined with switches similar to the switches 71 and 72. This will prove effective when both the first and second storing sections 23 and 24 are loaded with the same kind of bills, because either one of ¥1000 bills and ¥10,000 bills can be selected.

Further, the safe 22 may be provided with one or more storing sections in addition to the first and second storing sections 23 and 24. While the illustrative embodiments have been shown and described as using the unitary manifold safe 22, it may of course be replaced with traditional independent safes. In such a case, each of the independent safes will be provided with the movable regulating members 63 and 64, and the kind-of-bill sensing means 50 and near-end sensing means 78 will be used.

What is claimed is:

1. In a cash dispenser for dispensing bills in response to a customer's operation, said cash dispenser comprising a bill outlet for presenting bills to a customer, safe means removably mounted in said cash dispenser and loaded with bills to be dispensed, and feeding and transporting means for feeding bills from said safe means and transporting the bills to said bill outlet, the improvement wherein:

said safe means comprises a single casing in which a plurality of storing sections are defined, said storing sections being disposed at substantially the same level as each other and storing bills individually; and said feed and transporting means comprises a plurality of feeding means each being associated with a respective one of said storing sections for feeding the bills one by one from said storing sections associated therewith, and transport path means for transporting the bills fed by said feeding means to said bill outlet.

2. A cash dispenser in accordance with claim 1, further comprising:

lifting means for raising and lowering said casing between a first position for mounting and dismounting said casing and a second position defined below said first position for connecting said storing sections to said feeding means;

said feeding means individually feeding the bills stored from the respective said storing sections when said casing is held in the second position.

3. A cash dispenser in accordance with claim 1, further comprising printer means for printing out particulars of payment to a customer on a webbing of paper to produce a slip;

said feeding and transporting means further comprising temporary stacking means for temporarily stacking the bills fed by said feeding means and the slip outputted by said printer means before said bills and said slip are transported to said bill outlet.

4. A cash dispenser in accordance with claim 3, wherein said temporary stacking means comprises:

a first stage for temporarily stacking the bills which are fed by said feeding means; and a second stage disposed above said first stage for temporarily detaining the slip which is fed from said printer means;

said transport path means comprising first transport belt means for conveying the bills and slip detained at said temporary stacking means to said bill outlet while holding said bills and slip.

5. A cash dispenser in accordance with claim 3, wherein said transport path means comprises:

second transport belt means for conveying the bills fed by said feeding means to said temporary stacking means;

discriminating means for discriminating the bills being transported by said second transport belt means with respect to kind, for detecting unusual conditions of the bills, and for counting normal bills;

reject safe means for collecting the bills determined to be unusual by said discriminating means; and path switching means responsive to said discriminating means for directing the bills being transported by said second transport belt means toward said reject safe means when said bills are determined to be unusual.

6. A cash dispenser in accordance with claim 4, wherein said transport path means further comprises reject safe means for collecting the bills and slip which a customer has forgotten to remove from said bill outlet;

said first transport belt means being selectively operable in opposite directions for transporting the bills and slip left unremoved in said bill outlet to said reject safe means.

7. A cash dispenser in accordance with claim 1, wherein said safe means further comprises:

regulating means associated with at least one of said storing sections and having a variable distance for regulating a width of the bills stored in said storing section; and sensing means responsive to said regulating means for outputting a first signal representative of a kind of the bills stored in any of said storing means which is associated with said regulating means.

8. A cash dispenser in accordance with claim 2, wherein said lifting means comprises insertion path means disposed below said feeding means for defining an insertion path along which said casing is mounted and dismounted from said cash dispenser when said casing is in the first position.

9. A cash dispenser in accordance with claim 8, wherein said insertion path means comprises a support frame for supporting said casing and defining the insertion path throughout a front end and a rear end of said cash dispenser.

10. A cash dispenser in accordance with claim 7, further comprising control means responsive to said sensing means for controlling said feeding means and said transport path means, said control means responding to the first signal for selectively controlling said feeding means such that the bills are fed from any of said storing sections associated with said first signal and are transported to said bill outlet by said transport path means.

11. A cash dispenser in accordance with claim 10, further comprising operating means operated by a customer for entering particulars of payment; said control means responding to said operating means;

said control means, when the first signal shows that said storing sections are loaded with a single kind of bills, selecting one of said storing sections based on an amount of bills which are stored in said storing sections and, when said first signal shows that each of said storing sections is loaded with a different kind of bills, selecting one of said storing sections storing bills of a kind which is associated with the particulars of payment entered on said operating means and controlling said feeding means based on such selection.

12. A cash dispenser in accordance with claim 10, further comprising operating means operated by a customer for entering particulars of payment; said safe means comprising:

near-end sensing means individually associated with said storing sections each for producing a second signal by sensing that an amount of the bills stored in said storing section associated therewith has reached a predetermined threshold value; and setting means for setting the predetermined threshold value at a desired value which is smaller than an allowable upper limit of payment per transaction;

said control means being responsive to said operating means and said near-end sensing means for controlling said feeding means and said transport path means.

13. A cash dispenser in accordance with claim 12, wherein:

said control means, when the first signal shows that said storing sections are each loaded with a different kind of bills, selects one of said storing sections associated with the particulars of payment which are entered on said operating means and controls said feeding means based on such selection, and when the second signal appears in relation to one of said storing sections causes payment to be continued with the bills which are stored in the other of said storing sections; and said control means, when the first signal shows that said storing sections are loaded with a single kind of bills, selects one of said storing sections and controls said feeding means based on such selection, and when the second signal appears in relation to said one storing section controls said feeding means to feed an amount of unpaid bills associated with the particulars of payment entered on said operating means from the other of said storing means;

whereby the bills stored in said storing sections are fed out until the threshold value is reached.

14. A cash dispenser in accordance with claim 12, wherein:

said control means comprises memory means including first and second store areas for storing respectively first data representative of the kinds of bills stored in said storing sections which are identified by said control means in response to the first signal and second data representative of an upper limit of bills which may be fed from any of said storing sections associated with the second signal after said second signal has appeared;

said control means, when the first data shows that said storing section are each loaded with a different kind of bills, selects one of said storing sections associated with the particulars which are entered on said operating means and controls said feeding means based on such selection, and when the second signal appears in relation to one of said storing sections causes payment to be continued with the bills which are stored in the other of said storing section; and said control means, when the first data shows that said storing section are loaded with a single kind of bills, selects one of said storing sections and controls said feeding means based on such selection, and when the second signal appears in relation to said one storing section compares an amount of unpaid bills associated with the particulars of payment entered on said operating means with the second data to control said feeding means such that, if said amount of unpaid bills is smaller than said second data, payment is continued with the bills stored in said one storing section and, if said amount of unpaid bills is greater than said second data, all the bills stored in said one storing section are fed out and then the remaining amount of bills are fed from the other of said storing means;

whereby the bills stored in said storing sections are fed out until the threshold value is reached.

15. A safe to be removably mounted on a cash dispenser which dispenses bills in response to a customer's operation and to be used for storing bills to be dispensed, said safe comprising:

a single casing having a plurality of storing sections defined therein, said storing sections being disposed at substantially the same level as each other for storing bills individually;

regulating plates associated with at least one of said storing sections and having a variable distance for regulating a width of the bills which are stored in said at least one storing section; and sensing means responsive to said regulating plates for producing a first signal representative of a kind of the bills which are stored in said at least one of said storing sections associated with said regulating plates.

16. A safe in accordance with claim 15, further comprising:

near-end sensing means individually associated with said storing sections for producing a second signal when sensing that an amount of the bills stored in the associated said storing section has reached a predetermined threshold value; and setting means for setting the predetermined value at an allowable upper limit of payment for one transaction.

* * * * *